(12) United States Patent
Chen et al.

(10) Patent No.: US 11,463,327 B2
(45) Date of Patent: Oct. 4, 2022

(54) COMMERCE CHARACTERISTIC DATA REPORTING METHOD AND DEVICE, NETWORK SLICE ARRANGEMENT METHOD AND DEVICE

(71) Applicant: ZTE CORPORATION, Guangdong (CN)

(72) Inventors: Qihua Chen, Guangdong (CN); Liyang Zhao, Guangdong (CN); Changcheng Zhong, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 174 days.

(21) Appl. No.: 16/613,875

(22) PCT Filed: May 24, 2018

(86) PCT No.: PCT/CN2018/088276
§ 371 (c)(1),
(2) Date: Nov. 15, 2019

(87) PCT Pub. No.: WO2019/001186
PCT Pub. Date: Jan. 3, 2019

(65) Prior Publication Data
US 2020/0106680 A1 Apr. 2, 2020

(30) Foreign Application Priority Data
Jun. 30, 2017 (CN) .......................... 201710526189.1

(51) Int. Cl.
*H04L 41/5003* (2022.01)
*G06Q 30/02* (2012.01)
(Continued)

(52) U.S. Cl.
CPC ..... *H04L 41/5003* (2013.01); *G06Q 30/0201* (2013.01); *H04L 41/06* (2013.01); *H04L 41/20* (2013.01); *H04L 43/08* (2013.01)

(58) Field of Classification Search
CPC ................................. H04L 41/06; H04L 41/20
See application file for complete search history.

(56) References Cited

U.S. PATENT DOCUMENTS

| | | | |
|---|---|---|---|
| 2015/0006326 A1* | 1/2015 | Dong ................. | G06Q 30/0601 705/26.62 |
| 2016/0156513 A1* | 6/2016 | Zhang .................... | H04W 4/70 709/220 |

(Continued)

FOREIGN PATENT DOCUMENTS

| | | |
|---|---|---|
| CN | 106713406 A | 5/2017 |
| WO | 2017076086 | 5/2017 |
| WO | 2017080517 A1 | 5/2017 |

OTHER PUBLICATIONS

3rd Generation Partnership Project; Technical Specification Group Services and System Aspects; Study on Architecture for Next Generation System (Release 14), 3GPP TR 23.799 V14.0.0, Dec. 2016.

(Continued)

*Primary Examiner* — Nicholas R Taylor
*Assistant Examiner* — Sm Z Islam

(57) ABSTRACT

Provided are a commerce characteristic data reporting method and device, network slice arrangement method and device, storage medium, the method comprising: receiving software commerce characteristic data of a virtual network function (VNF) sent by a virtual net-work function manager (VNFM), and receiving resource commerce characteristic data of the VNF sent by a virtual infrastructure manager (VIM); obtaining commerce characteristic data of the VNF according to the software commerce characteristic data and (Continued)

resource commerce characteristic data; and reporting the commerce characteristic data of the VNF to a slice arrangement system, wherein the commerce characteristic data of the VNF is used in the slice arrangement system to arrange network slices.

9 Claims, 18 Drawing Sheets

(51) Int. Cl.
*H04L 41/06* (2022.01)
*H04L 43/08* (2022.01)
*H04L 41/00* (2022.01)

(56) References Cited

U.S. PATENT DOCUMENTS

| | | |
|---|---|---|
| 2019/0123963 A1* | 4/2019 | Tang ................ H04W 4/70 |
| 2019/0215235 A1* | 7/2019 | Chou ............... G06F 9/45558 |
| 2020/0084107 A1* | 3/2020 | Li .................. H04L 41/5054 |
| 2020/0178160 A1* | 6/2020 | Ji ................... H04W 48/12 |

OTHER PUBLICATIONS

International search report of PCT Patent Application No. PCT/CN2018/088276 dated Aug. 9, 2018.

* cited by examiner

COMMERCE CHARACTERISTIC DATA REPORTING METHOD AND DEVICE, NETWORK SLICE ARRANGEMENT METHOD AND DEVICE

CROSS-REFERENCE TO RELATED APPLICATIONS

This application is filed based upon and claims priority to Chinese patent application No. 201710526189.1, filed on Jun. 30, 2017, the contents of which are incorporated herein by reference in their entirety.

FIELD OF THE INVENTION

The present disclosure relates to the field of communication, and in particular, to a commerce characteristic data reporting method and device, as well as a network slice orchestration method and device and a storage medium thereof.

BACKGROUND OF THE INVENTION

In the field of management of wireless communication systems, the concept of Network Functions Virtualization (NFV) is proposed by the operating company to improve the flexibility of a communication network and reduce the management cost. FIG. 1 is a schematic diagram of reference architecture of the NFV according to a related art. With the use of the NFV technology, original physical network elements device are replaced with Virtualization Network Functions (VNFs) such that a Network Function (NF) is decoupled from specific hardware. As shown in FIG. 1, the VNF is isolated from an underlying Network Functions Virtualization Infrastructure (NFVI). A life cycle management function of the VNF is performed through a VNF Manager (VNFM). The underlying NFVI is managed by a Virtualization Infrastructure Manager (VIM). A specific network service is usually implemented through one or more VNF instances. Management of the network service is performed through an Network Functions Virtualization Orchestrator (NFVO).

The 3rd Generation Partnership Project (3GPP) provides a new 5th-Generation (5G) architecture based on network virtualization to support data connection and service such that NFV is applicable to the deployment to meet a network requirement of 5G. As shown in FIG. 2 (referring to 3GPP 23799), a network slice is an essential constituent of 5G. The network slice mainly refers to an instantiated logical network having specific network characteristics and composed of a group of NFs (including network resources supporting these NFs). The logical network is adopted to meet requirements of specific network services of a certain type. Network characteristic data refers to characteristic data related to service capabilities of the NFs, for example, ultra-low latency and ultra-high reliability. The network slice is obtained by instantiation on basis of a network slice blueprint (which refers to a complete definition for describing a structure, configuration and workflow of a network slice instance, wherein instantiation of the network slice and control and management over a life cycle of the network slice are completed according to the definition of the network slice blueprint), and thus is also called a network slice instance. That is, different network slices usually have different performance requirements in order to meet requirements of different types of applications. As shown in FIG. 3, there are three network slices A/B/Ct, and NF in each of the network slices has individually independent network characteristics or network capabilities, such as, parameters like a deployment position of the NF, a network bandwidth, latency, jitter and a packet loss rate, which are collectively referred to as network characteristics of the NF hereinafter. Besides the network characteristics, the NF in each of the network slices also has some data related to commerce of the NFs, such as, a price of NF's software and service life cycle of the software-only; the deployment position of the NF, leasing relationship of a NF's deployment hardware, leasing price of the deployment hardware and leasing life cycle of the deployment hardware and the like, which are collectively referred to as commerce characteristics of the NF.

As shown in Table 1, an operating company at a primary operation stage deploys its own hardware infrastructures (NFVI) in a region 2 only and leases third-party hardware in the region 1 and the region 3 to deploy related NFs due to a fund investment limit. Along with constant increase of the fund, the operating company may gradually extend its own hardware resources in the region 1 and the region 3 and replace the hardware in the region 1 and the region 3. There is made such a hypothesis that present network characteristics and commerce characteristics of part of the NFs are shown in the following table.

TABLE 1

Network Characteristics and Commerce Characteristics of Part of NFs

| Name of NF | Network characteristic of NF | Commerce characteristic of NF | Corresponding slice | Application |
|---|---|---|---|---|
| UPF1 | High latency and low bandwidth . . . | Region 1, leasing of third-party hardware, high leasing price, short leasing cycle and high deployment cost | Slice A | Electric water meter reading service |
| UPF2-1 | Low latency and middle bandwidth . . . | Region 2, use of self-own hardware, no leasing price, infinite leasing cycle and low deployment cost | Slice B | Internet of vehicles service |
| UPF2-2 | High latency and low bandwidth . . . | Region 2, use of self-own hardware, no leasing price, infinite leasing cycle and low deployment cost | No slice divided | None |
| UPF3 | Middle latency and high bandwidth . . . | Region 3, leasing of third-party hardware, high leasing price, short leasing cycle and high deployment cost | Slice C | QQLive |

At present, a power supply company in the region 2 is intended to lease a network of the operating company for electric meter reading service. If attention is only paid to network characteristic data of UPFs (NFs), it is apparent that the high-latency and low-bandwidth network UPF1 may meet such service, and the operating company may reuse an existing network slice A to serve the power supply company. However, a practical circumstance is that the UPF1 requires certain hardware leasing cost and is also short in leasing cycle and, if the lease was due and the operating company was not intended to renew the lease, there may be a hardware change risk in the future. Therefore, during slice orchestration, the commerce characteristics of the NFs are also required to be fully considered. As shown in FIG. 4, the UPF2-2 in the region 2 (SMF2-2 and UPF2-2 in the figure may be existing NFs and may also be new NFs to be created soon) not only meets network characteristic requirements (high latency and low bandwidth) but also meets a requirement of low deployment cost, so the SMF2-2, the UPF2-2 and other shared NFs are combined to create a completely new network slice D to serve the power supply company, which is the most reasonable orchestration and deployment of the operating company at present.

As described above, either creating a new network slice or reusing an existing network slice is a kind of work of network slice orchestration and is completed by a slice orchestration system. The slice orchestration system may run part of functions of an Operations Support System (OSS), may also run part of functions of a Commerce Support System (BSS), and may also run part of functions of other Network Management Systems (NMSs) and may also be an independent NMS, which are collectively referred to as "slice orchestration system" hereinafter. When a power supply company makes a leasing request to the operating company, the slice orchestration system is not only need to know about network characteristic data of NFs but also required to know about commerce characteristic data of the NFs. A slice orchestrated may not only meet a requirement of the leasee (the power supply company) but also be consistent with the interest of the operating company in terms of reduction in the deployment cost as long as reference is made in combination with the data of these two aspects.

However, a slice orchestration system in the related art may not know about a commerce characteristic of an NF and thus an orchestrated slice may not ensure reduction in the deployment cost of the operating company.

SUMMARY OF THE INVENTION

Embodiments of the present disclosure provide a commerce characteristic data reporting method and device, a network slice orchestration method and device and a storage medium, which at least solve the problem in the related art that a slice orchestration system is incapable of knowing about a commerce characteristic of an NF such that an orchestrated slice may not ensure effectiveness in the deployment cost of an operating company.

According to one embodiment of the present disclosure, a commerce characteristic data reporting method is provided, which includes that: software commerce characteristic data of VNFs is received from a VNFM, and resource commerce characteristic data of the VNFs is received from a VIM; commerce characteristic data of the VNFs is acquired according to the software commerce characteristic data and the resource commerce characteristic data; and the commerce characteristic data of the VNFs is reported to a slice orchestration system, the commerce characteristic data of the VNFs being configured for the slice orchestration system to orchestrate network slices.

In one implementation mode of the embodiment of the present disclosure, the commerce characteristic data of the VNFs includes commerce characteristic data of a VNF that has been deployed and commerce characteristic data of a VNF that has not been deployed.

In one implementation mode of the embodiment of the present disclosure, the commerce characteristic data of the VNFs being acquired according to the software commerce characteristic data and the resource commerce characteristic data includes that: software commerce characteristic data of the VNF that has been deployed in the VNFs is integrated with resource commerce characteristic data required by the software commerce characteristic data of the VNF that has been deployed to acquire the commerce characteristic data of the VNF that has been deployed, the software commerce characteristic data of the VNF that has been deployed in the VNFs being included in the software commerce characteristic data and the resource commerce characteristic data required by the software commerce characteristic data of the VNF that has been deployed being included in the resource commerce characteristic data; and software commerce characteristic data of the VNF that has not been deployed in the VNFs is integrated with resource commerce characteristic data required by the software commerce characteristic data of the VNF that has not been deployed to acquire the commerce characteristic data of the VNF that has not been deployed, the software commerce characteristic data of the VNF that is not deployed in the VNFs being included in the software commerce characteristic data and the resource commerce characteristic data required by the software commerce characteristic data of the VNF that is not deployed being included in the resource commerce characteristic data.

In one implementation mode of the embodiment of the present disclosure, after the commerce characteristic data of the VNFs is reported to the slice orchestration system, the method further includes that: a lease term alarm information of the VNF that has been deployed is received; and the lease term alarm information is reported to the slice orchestration system, the lease term alarm information being configured for the slice orchestration system to orchestrate the network slices.

In one implementation mode of the embodiment of the present disclosure, the commerce characteristic data of the VNFs being reported to the slice orchestration system includes that: a query request of querying the commerce characteristic data of the VNFs is received from the slice orchestration system; the commerce characteristic data of the VNFs is locally retrieved according to the query request; and the queried commerce characteristic data of the VNFs is reported to the slice orchestration system.

According to another embodiment of the present disclosure, a network slice orchestration method is provided, which includes that: commerce characteristic data of VNFs reported by a Network Business Management Function (NBMF) is received; network characteristic data of the VNFs that is required by a user is acquired; and network slices are orchestrated according to the commerce characteristic data of the VNFs and the network characteristic data of the VNFs.

In one implementation mode of the embodiment of the present disclosure, the network slices being orchestrated according to the commerce characteristic data of the VNFs and the network characteristic data of the VNFs includes that: a lease term alarm information of a VNF that has been deployed in the VNFs reported by the NBMF is received; and the network slices are orchestrated according to the lease term alarm information, the commerce characteristic data of the VNFs and the network characteristic data of the VNFs.

In one implementation mode of the embodiment of the present disclosure, the commerce characteristic data of the VNFs reported by the NBMF being received includes that:

a query request of querying the commerce characteristic data of the VNFs is sent to the NBMF; and a response information with which the NBMF responds to the query request is received, the response information containing the commerce characteristic data of the VNFs.

According to another embodiment of the present disclosure, a commerce characteristic data reporting device, which includes: a receiving module, configured to receive software commerce characteristic data of VNFs from a VNFM and receive resource commerce characteristic data of the VNFs from a VIM; an acquisition module, configured to acquire commerce characteristic data of the VNFs according to the software commerce characteristic data and the resource commerce characteristic data; and a reporting module, configured to report the commerce characteristic data of the VNFs to a slice orchestration system, the commerce characteristic data of the VNFs being configured for the slice orchestration system to orchestrate network slices.

In one implementation mode of the embodiment of the present disclosure, the acquisition module is further configured to integrate software commerce characteristic data of a VNF that has been deployed in the VNFs with resource commerce characteristic data required by the software commerce characteristic data of the VNF that has been deployed to acquire commerce characteristic data of the VNF that has been deployed, the software commerce characteristic data of the VNF that has been deployed in the VNFs being included in the software commerce characteristic data, and the resource commerce characteristic data required by the software commerce characteristic data of the VNF that has been deployed being included in the resource commerce characteristic data, and to integrate software commerce characteristic data of a VNF that has not been deployed in the VNFs and resource commerce characteristic data required by the software commerce characteristic data of the VNF that has not been deployed to acquire commerce characteristic data of the VNF that is not deployed, the software commerce characteristic data of the VNF that is not deployed in the VNFs being included in the software commerce characteristic data, and the resource commerce characteristic data required by the software commerce characteristic data of the VNF that has not been deployed being included in the resource commerce characteristic data.

In one implementation mode of the embodiment of the present disclosure, the reporting module is further configured to, after the commerce characteristic data of the VNFs is reported to the slice orchestration system, receive a lease term alarm information of the VNF that has been deployed and report the lease term alarm information to the slice orchestration system, the lease term alarm information being configured for the slice orchestration system to orchestrate the network slices.

According to another embodiment of the present disclosure, a network slice orchestration device is provided, which includes: a receiving module, configured to receive commerce characteristic data of VNFs reported by an NBMF; an acquisition module, configured to acquire network characteristic data of the VNFs that is required by a user; and an orchestration module, configured to orchestrate network slices according to the commerce characteristic data of the VNFs and the network characteristic data of the VNFs.

In one implementation mode of the embodiment of the present disclosure, the orchestration module is further configured to receive a lease term alarm information of a VNF that has been deployed in the VNFs that is reported by the NBMF and orchestrate the network slices according to the lease term alarm information, the commerce characteristic data of the VNFs and the network characteristic data of the VNFs.

According to another embodiment of the present disclosure, a storage medium is also provided, which includes a stored program, the program when running carries out any of the abovementioned methods.

According to another embodiment of the present disclosure, a processor is also provided, which is configured to run a program, the program when running carries out any of the abovementioned methods.

Through the present disclosure, the software commerce characteristic data of the VNFs is received from the VNFM, and the resource commerce characteristic data of the VNFs is received from the VIM; the commerce characteristic data of the VNFs is acquired according to the software commerce characteristic data and the resource commerce characteristic data; and the commerce characteristic data of the VNFs is reported to the slice orchestration system, the commerce characteristic data of the VNFs being configured for the slice orchestration system to orchestrate the network slices. As a result of that the commerce characteristic data of the VNFs is acquired according to the software commerce characteristic data of the VNFs that is reported by the VNFM and the resource commerce characteristic data of the VNFs that is reported by the VIM and then the commerce characteristic data is reported to the slice orchestration system, the slice orchestration system may orchestrate the network slices according to the commerce characteristic data of the VNFs, and reduction in the deployment cost of an operating company is ensured. Therefore, the problem in the related art that a slice orchestration system is incapable of knowing about a commerce characteristic of an NF such that an orchestrated slice may not ensure effectiveness in the deployment cost of an operating company may be solved, and the effect of reducing the deployment cost may be achieved.

BRIEF DESCRIPTION OF THE DRAWINGS

The accompanying drawings described here are adopted to provide further understandings of the present disclosure and constitute one part of the present disclosure. Schematic embodiments of the present disclosure and descriptions thereof are adopted to explain the present disclosure and not intended to form improper limits thereto. In the accompanying drawings.

DETAILED DESCRIPTION OF THE EMBODIMENTS

The present disclosure will be described in details below with reference to the accompanying drawings and the embodiments. It is to be noted that the embodiments in the present disclosure and characteristics in the embodiments may be combined without conflicts.

It is to be noted that terms "first", "second" and the like in the specification, claims and accompanying drawings of the present disclosure are adopted not to describe a specific sequence or order but to distinguish similar objects.

Embodiment 1

Figure 1:
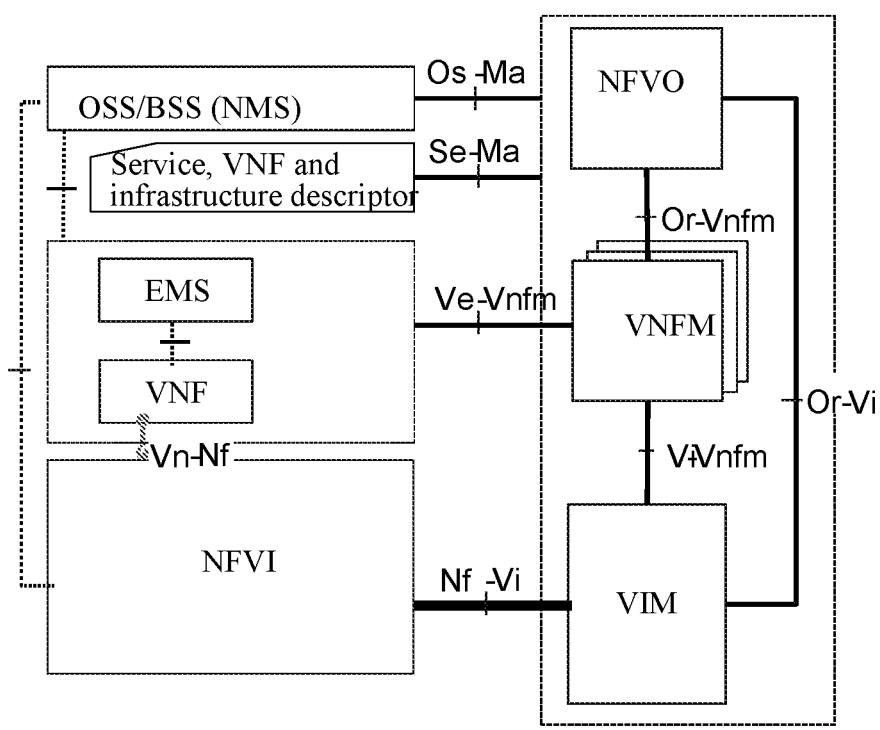
FIG. 1 is a schematic diagram of reference architecture of NFV according to the related art.
Figure 2:
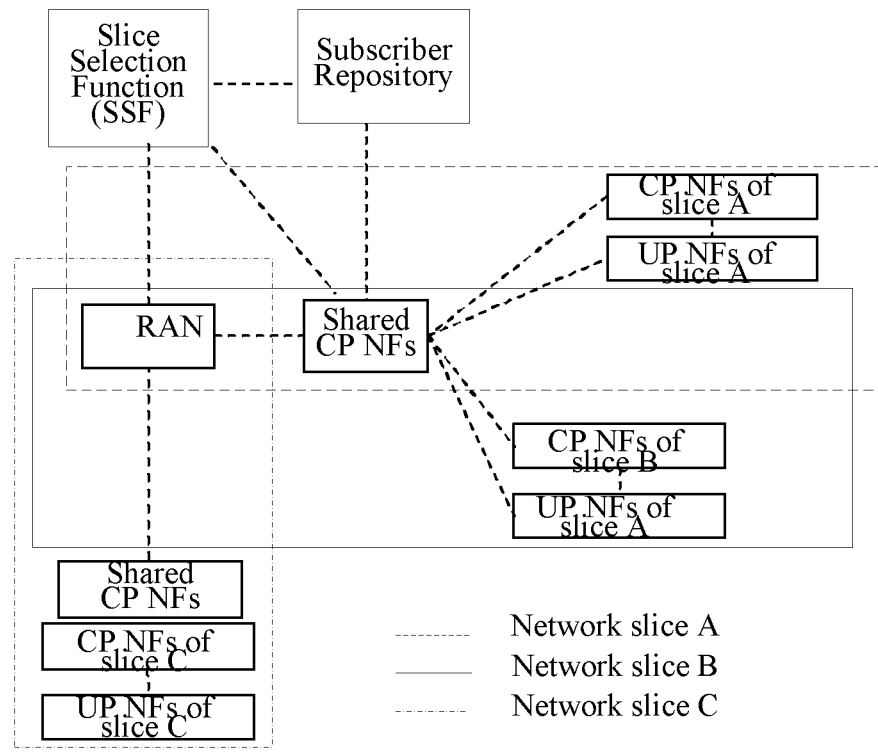
FIG. 2 is a schematic diagram of architecture of a 5G network slice according to the related art.
Figure 3:
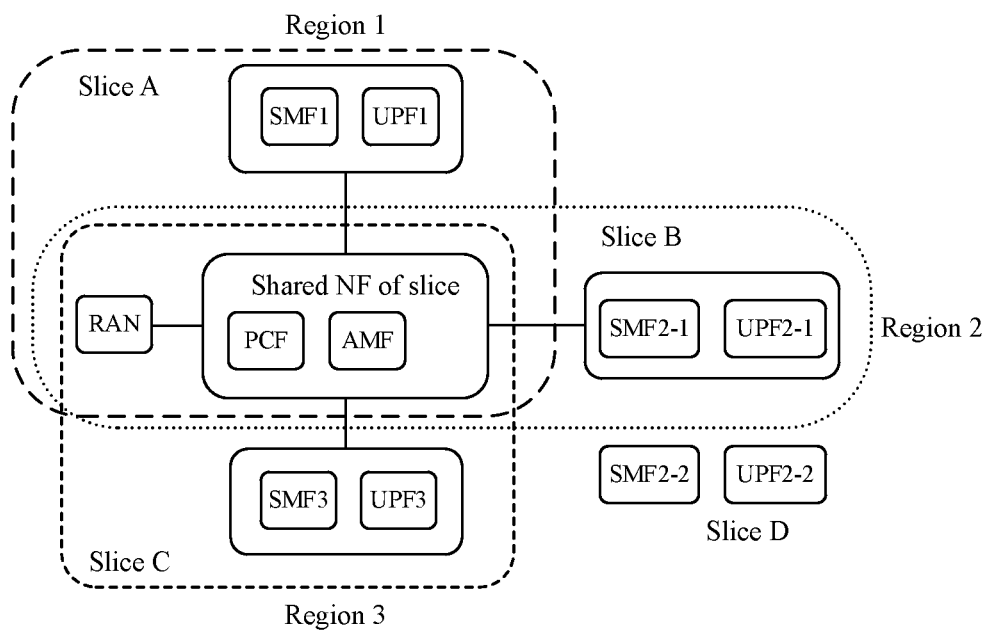
FIG. 3 is a schematic diagram of a first specific application of network slices according to the related art.
Figure 4:
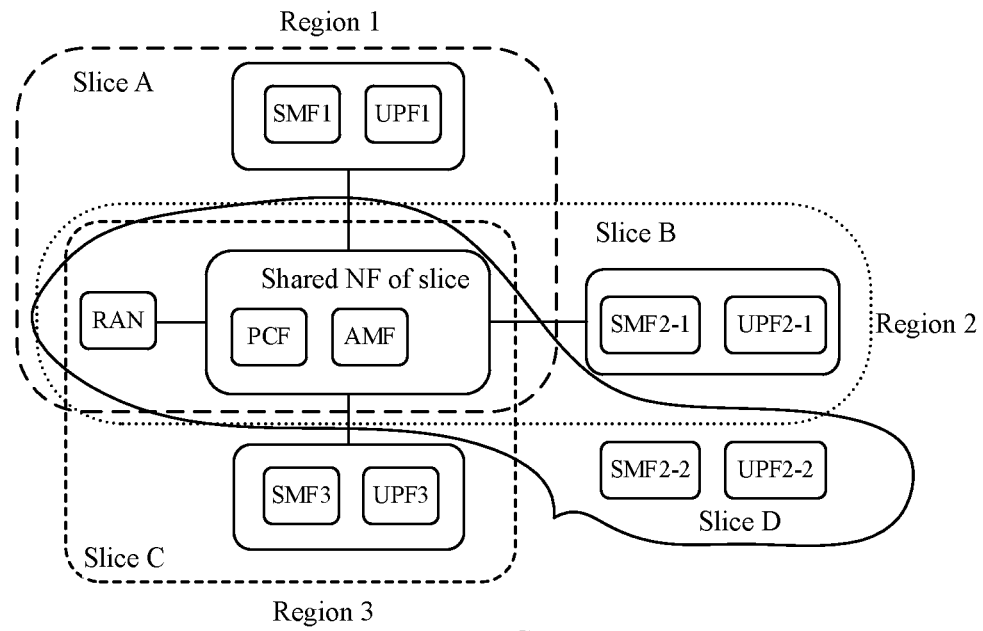
FIG. 4 is a schematic diagram of a second specific application of network slices according to the related art.
Figure 5:
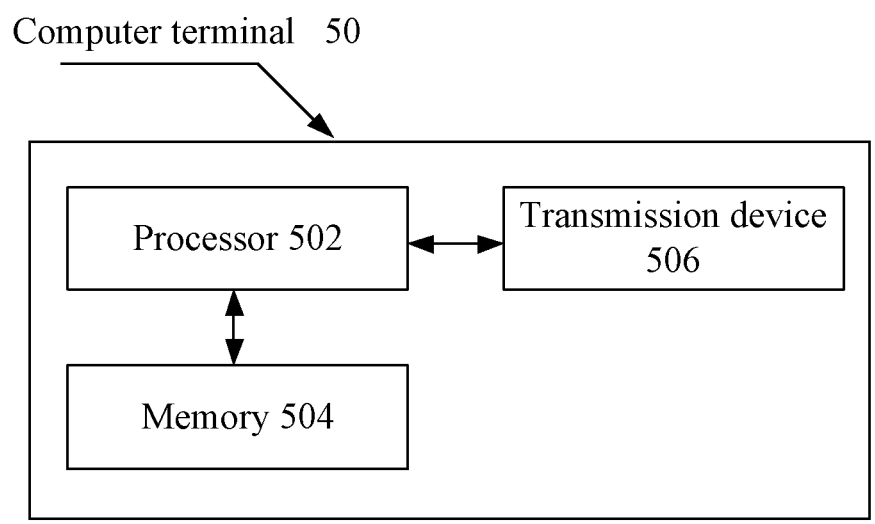
FIG. 5 is a block diagram of a hardware structure of a computer terminal for a commerce characteristic data reporting method according to an embodiment of the present disclosure.

The method embodiment provided in embodiment 1 of the present disclosure may be executed in a computer terminal or a similar computing device. An example is taken with the method embodiment being executed in the computer terminal. FIG. 5 is a block diagram of a hardware structure of a computer terminal for a commerce characteristic data reporting method according to an embodiment of the present disclosure. As shown in FIG. 5, the computer terminal 50 may include one or more (there is only one shown in the figure) processors 502 (the processor 502 may include, but not limited to, a processing device of a Micro Control Unit (MCU) or of a Field Programmable Gate Array (FPGA), etc.), a memory 504 configured to store data, and a transmission device 506 configured for a communication function. Those of ordinary skill in the art should know that the structure shown in FIG. 5 is only illustrative and not intended to limit the structure of the electronic device. For example, the computer terminal 50 may further include components more or fewer than those shown in FIG. 5 or adopt a configuration different from that shown in FIG. 5.

The memory 504 may be configured to store a software program and module of application software, for example, a program instruction/module corresponding to the commerce characteristic data reporting method provided in the embodiment of the present disclosure. The processor 502 runs the software program and module stored in the memory 504, thereby executing various functional applications and data processing, namely implementing the abovementioned method. The memory 504 may include a high-speed Random Access Memory (RAM) and may also include a non-volatile memory, for example, one or more magnetic storage devices, flash memories or other nonvolatile solid-state memories. In some examples, the memory 504 may further include a memory arranged remotely relative to the processor 502 and the remote memory may be connected to the computer device 50 through a network. An example of the network includes, but not limited to, the Internet, an intranet, a local area network, a computer communication network and a combination thereof.

The transmission device 506 is configured to receive or send data through a network. A specific example of the network may include a wireless network provided by a communication provider of the computer device 50. In an example, the transmission device 506 includes a Network Interface Controller (NIC), which may be coupled to other network devices through a base station, thereby communicating with the Internet. In an example, the transmission device 506 may be a Radio Frequency (RF) module, configured to communicate with the Internet in a wireless manner.

Figure 6:
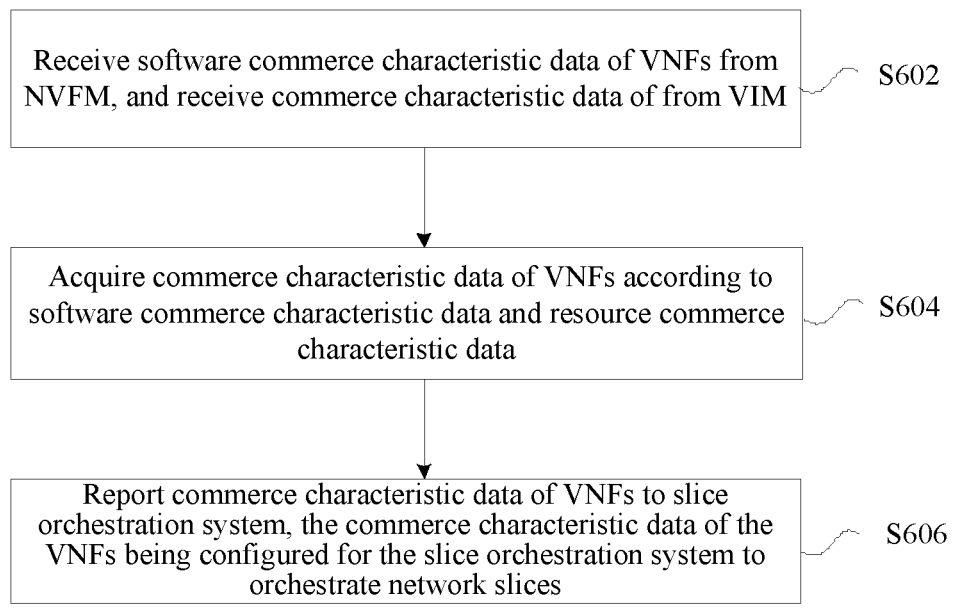
FIG. 6 is a flowchart of a commerce characteristic data reporting method according to an embodiment of the present disclosure.

In this embodiment, a commerce characteristic data reporting method running in the computer terminal is provided. FIG. 6 is a flowchart of the commerce characteristic data reporting method according to the embodiment of the present disclosure. As shown in FIG. 6, the flow includes the following steps.

In S602, software commerce characteristic data of VNFs is received from a VNFM, and resource commerce characteristic data of the VNFs is received from a VIM.

In S604, commerce characteristic data of the VNFs is acquired according to the software commerce characteristic data and the resource commerce characteristic data.

In S606, the commerce characteristic data of the VNFs is reported to a slice orchestration system, wherein the commerce characteristic data of the VNFs is used to orchestrate network slices by the slice orchestration system.

Through the steps, the commerce characteristic data of the VNFs is acquired according to the software commerce characteristic data of the VNFs reported by the VNFM and the resource commerce characteristic data of the VNFs reported by the VIM, and is reported to the slice orchestration system, so that the slice orchestration system may orchestrate the network slices according to the commerce characteristic data of the VNFs, and thereby reduction in the deployment cost of an operating company is ensured. Therefore, the problem in the related art that a slice orchestration system is incapable of knowing about a commerce characteristic of an NF such that an orchestrated slice may not ensure effectiveness in the deployment cost of an operating company may be solved, and the effect of reducing the deployment cost may be achieved.

In one implementation mode of the embodiment of the present disclosure, the commerce characteristic data of the VNFs includes commerce characteristic data of a VNF that has been deployed and commerce characteristic data of a VNF that has not been deployed yet.

In one implementation mode of the embodiment of the present disclosure, the operation that the commerce characteristic data of the VNFs is acquired according to the software commerce characteristic data and the resource commerce characteristic data includes that: software commerce characteristic data of the VNF that has been deployed in the VNFs is integrated with resource commerce characteristic data required by the software commerce characteristic data of the VNF that has been deployed to acquire the commerce characteristic data of the VNF that has been deployed, wherein the software commerce characteristic data of the VNF that has been deployed in the VNFs is included in the software commerce characteristic data, and the resource commerce characteristic data required by the software commerce characteristic data of the VNF that has been deployed is included in the resource commerce characteristic data.; and software commerce characteristic data of the VNF that has not been deployed in the VNFs is integrated with resource commerce characteristic data required by the software commerce characteristic data of the VNF that has not been deployed to acquire the commerce characteristic data of the VNF that has not been deployed, wherein the software commerce characteristic data of the VNF that has not been deployed in the VNFs is included in the software commerce characteristic data, and the resource commerce characteristic data required by the software commerce characteristic data of the VNF that has not been deployed is included in the resource commerce characteristic data.

In one implementation mode of the embodiment of the present disclosure, subsequent to the commerce characteristic data of the VNFs is reported to the slice orchestration system, the method further includes that: a lease term alarm information of the VNF that has been deployed is received; and the lease term alarm information is reported to the slice orchestration system, the lease term alarm information being configured for the slice orchestration system to orchestrate the network slices.

In one implementation mode of the embodiment of the present disclosure, the operation that the commerce characteristic data of the VNFs is reported to the slice orchestration system includes that: a query request of querying the commerce characteristic data of the VNFs is received from the slice orchestration system; the commerce characteristic data of the VNFs is locally retrieved according to the query request; and the retrieved commerce characteristic data of the VNFs is reported to the slice orchestration system.

Figure 7:
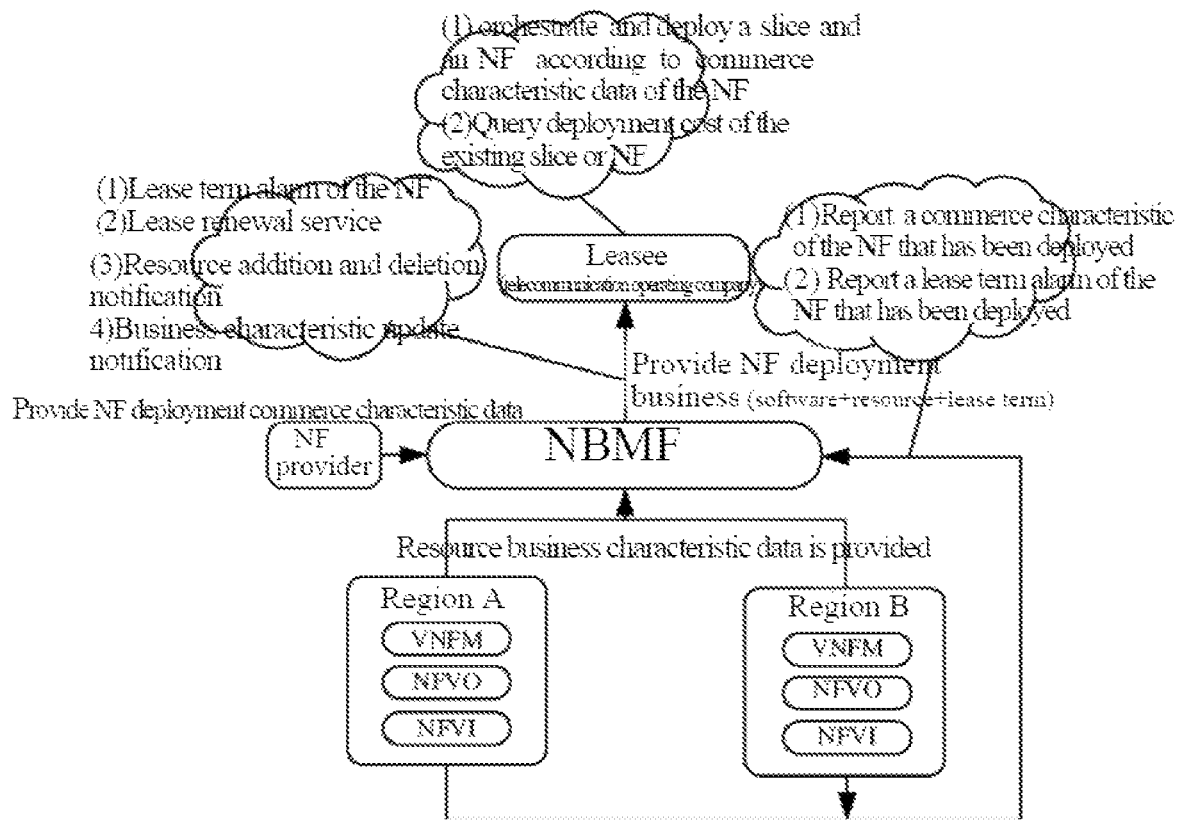
FIG. 7 is a schematic diagram of a preferred processing framework for commerce characteristic data of an NF according to an embodiment of the present disclosure.
Figure 8:
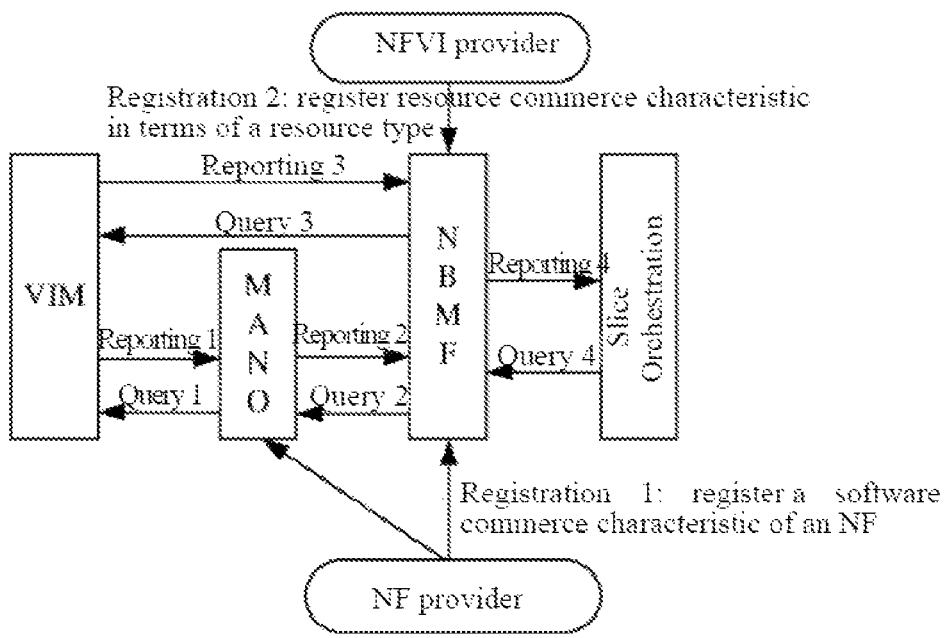
FIG. 8 is a schematic diagram of registration/reporting of commerce characteristic data according to an embodiment of the present disclosure.

For conveniently understanding the embodiment, introductions will be made below in combination with FIG. 7 and FIG. 8. FIG. 7 is a schematic diagram of a preferred processing framework for commerce characteristic data of an NF according to an embodiment of the present disclosure, and FIG. 8 is a schematic diagram of registration/reporting of commerce characteristic data according to an embodiment of the present disclosure. As shown in FIG. 7 and FIG. 8, the method includes six parts.

First Part: Registration

1. An network business management function (NBMF) of an NF is added (as shown in FIG. 7).

2. An NF provider registers or updates the software commerce characteristic data in the NBMF (Registration 1 shown in FIG. 8) to provide an approach and capability for the NF of registering the software commerce characteristic thereof.

3. The NF provider packs the commerce characteristic data into a version server for reporting the data to the NBMF uniformly by a MANO (registration 1 shown in FIG. 8).

4. An NFVI or an NFVI provider registers or updates the resource commerce characteristic data in the NBMF by a VIM (Registration 2 shown in FIG. 8).

Second Part: Query and Reporting Between the VIM and the MANO

1. The VIM reports the resource commerce characteristic data to the MANO in terms of a resource type (Reporting 1 shown in FIG. 8).

2. The VIM reports commerce characteristic data of a resource that has been deployed to the MANO (Reporting 1 shown in FIG. 8).

3. The VIM reports/clears a lease term alarm of the resource that has been deployed to the MANO (Reporting 1 shown in FIG. 8).

4. The MANO queries the resource commerce characteristic data from the VIM in terms of the resource type (Query 1 shown in FIG. 8).

5. The MANO queries the commerce characteristic data of the resource that has been deployed from the VIM (Query 1 shown in FIG. 8).

6. The MANO queries the lease term alarm of the resource that has been deployed from the VIM (Query 1 shown in FIG. 8).

Third Part: Query and Reporting Between the MANO and the NBMF

1. The MANO reports software commerce characteristic data of the NF to the NBMF (Reporting 2 shown in FIG. 8).

2. The MANO reports, in terms of the resource type, the resource commerce characteristic data to the NBMF (Reporting 2 shown in FIG. 8).

3. The MANO associates and integrates a software commerce characteristic of the NF that has been deployed with a commerce characteristic of the resource occupied by the NF to obtain a commerce characteristic of the NF that has been deployed.

4. The MANO associates and integrates the lease term alarm of the resource that has been deployed with the NF to obtain a lease term alarm of the NF that has been deployed.

5. The MANO reports the commerce characteristic data of the NF that has been deployed to the NBMF (Reporting 2 shown in FIG. 8).

6. The MANO reports/clears the lease term alarm of the NF that has been deployed to the NBMF (Reporting 2 shown in FIG. 8).

7. The NBMF queries the software commerce characteristic data of the NF from the MANO (Query 2 shown in FIG. 8).

8. The NBMF queries the resource commerce characteristic data from the MANO in terms of the resource type (Query 2 shown in FIG. 8).

9. The NBMF queries the commerce characteristic data of the NF that has been deployed from the MANO (Query 2 shown in FIG. 8).

10. The NBMF queries the lease term alarm of the NF that has been deployed from the MANO (Query 2 shown in FIG. 8).

Through these parts, an approach and capability of reporting the commerce characteristic data of the NF is provided for the MANO.

Fourth Part: Query and Reporting Between the VIM and the NBMF

1. The VIM reports the resource commerce characteristic data to the NBMF in terms of the resource type (Reporting 3 shown in FIG. 8).

2. The VIM reports the commerce characteristic data of the resource that has been deployed to the NBMF (Reporting 3 shown in FIG. 8).

3. The NBMF queries the resource commerce characteristic data from the VIM in terms of the resource type (Query 3 shown in FIG. 8).

4. The NBMF queries the commerce characteristic data of the resource that has been deployed from the VIM (Query 3 shown in FIG. 8).

Through the part, an approach and capability of reporting the resource commerce characteristic data is provided for the VIM.

Fifth Part: Query and Reporting Between the NBMF and the Slice Orchestration System 1. The NBMF reports the software commerce characteristic data of the NF to the slice orchestration system (Reporting 4 shown in FIG. 8).

2. The NBMF reports, in terms of the resource type, the resource commerce characteristic data to the slice orchestration system (Reporting 4 shown in FIG. 8).

3. The NBMF reports the commerce characteristic data of the NF that has been deployed to the slice orchestration system (Reporting 4 shown in FIG. 8).

4. The NBMF reports/clears the lease term alarm of the NF that has been deployed to the slice orchestration system (Reporting 4 shown in FIG. 8).

5. The slice orchestration system queries the software commerce characteristic data of the NF from the NBMF (query 4 shown in FIG. 8).

6. The slice orchestration system queries the resource commerce characteristic data from the NBMF in terms of the resource type (Query 4 shown in FIG. 8).

7. The slice orchestration system queries the commerce characteristic data of the NF that has been deployed from the NBMF (Query 4 shown in FIG. 8).

8. The slice orchestration system queries the lease term alarm of the NF that has been deployed from the NBMF (Query 4 shown in FIG. 8).

Sixth Part: An Advanced Deployment Business Mode is Provided.

1. For promoting its own software/hardware resources to an operating company, a software/hardware provider provides a large number of software/hardware facilities for the operating company for trial use for free at an initial service operation stage.

2. The slice orchestration system acquires the commerce characteristic data of related NFs and resources via the NBMF to simulate a list of software/hardware resources occupied by NFs (or slices) which is required at present and in the future.

3. The operating company may directly apply a result calculated by above simulation to an NF (or slice) deployed on trial, a life cycle of the NF deployed on trial being determined by negotiation of the operating company and the software/hardware provider.

4. The operating company may query a lease term of the NF for trial anytime.

5. The NBMF reports the alarm to the slice orchestration system when the lease term of the NF for trial use expires.

6. The operating company performs business negotiation with the software/hardware provider according to a trial use effect or according to the result calculated by the simulation.

7. After an agreement is reached by negotiation, the operating company deploys the NF (or the slice) for a business purpose instead.

Through the part, the provider promotes its own products rapidly by providing the resources for free at the initial service operation stage, and may gradually recover the cost at a later stage according to a practical using condition of software/hardware. Moreover, the operating company may not only pay the provider according to the practical using condition of the software/hardware but also estimate the deployment cost of a new service (or slice) in the future anytime.

Through the six parts mentioned above in the present disclosure, network business management function (NBMF) is added for the NF, which provides a processing method and device for the business characteristic of the NF. Thus, the deployment cost of the slice and the NF may be fully considered when the operating company orchestrates and deploys the network slice and the NF, so that an orchestration and deployment result is fully consistent with the interests of the operating company.

The followings are to be noted.

1: The software commerce characteristic data of the NF includes, but not limited to, a price of software of the NF, a life cycle of software service, a service provider, version information, function introductions, a deployment specification, how much resource required to be occupied after deployment and the like.

2: The resource commerce characteristic data includes, but not limited to, a resource position, a service provider, a leasing price, a life cycle, version information, function introductions, a deployment specification, how much resource required to be occupied after deployment and the like.

3: The commerce characteristic data of the NF includes the software commerce characteristic data of the NF and the commerce characteristic data of the occupied resource.

4: Updating of the software commerce characteristic data of the NF includes, but not limited to, addition, deletion and modification of the software commerce characteristic data.

5: Updating of the commerce characteristic data of the resource includes, but not limited to, addition, deletion and modification of the commerce characteristic data of the resource.

The present disclosure relates, but not limited, to a management technology of a wireless communication system, in particular to a 5G network system organized and defined based on the 3GPP.

Figure 9:
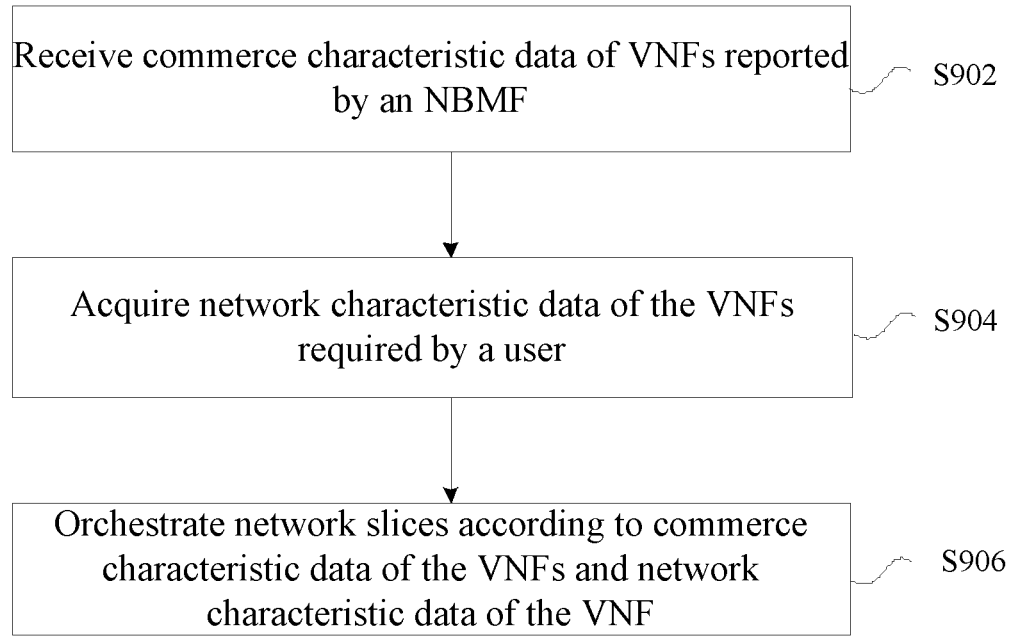
FIG. 9 is a flowchart of a network slice orchestration method according to an embodiment of the present disclosure.

The embodiment provides a network slice orchestration method running in the computer terminal. FIG. 9 is a flowchart of a network slice orchestration method according to an embodiment of the present disclosure. As shown in FIG. 9, the flow includes the following steps.

In S902, commerce characteristic data of VNFs reported by an NBMF is received.

In S904, network characteristic data of the VNFs required by a user is acquired.

In S906, network slices are orchestrated according to the commerce characteristic data of the VNFs and the network characteristic data of the VNFs.

Through the steps, not only is the network characteristic data of the VNFs acquired, but also the commerce characteristic data of the VNFs is acquired, so that the slice orchestration system may orchestrate the network slices according to the commerce characteristic data of the VNFs and the network characteristic data of the VNFs, and thereby reduction in the deployment cost of the operating company is ensured. Therefore, the problem in the related art that a slice orchestration system is incapable of knowing about a commerce characteristic of an NF such that an orchestrated slice may not ensure effectiveness in the deployment cost of an operating company may be solved, and the effect of reducing the deployment cost may be achieved.

In one implementation mode of the embodiment of the present disclosure, the operation that the network slices are orchestrated according to the commerce characteristic data of the VNFs and the network characteristic data of the VNFs includes that: a lease term alarm information, reported by the NBMF, of a VNF that has been deployed in the VNFs reported by the NBMF is received; and the network slices are orchestrated according to the lease term alarm information, the commerce characteristic data of the VNFs and the network characteristic data of the VNFs.

In one implementation mode of the embodiment of the present disclosure, the operation that the commerce characteristic data of the VNFs reported by the NBMF is received includes that: a query request of querying the commerce characteristic data of the VNFs is sent to the NBMF; and a response information with which the NBMF responds to the query request is received, the response information containing the commerce characteristic data of the VNFs.

In one implementation mode of the embodiment of the present disclosure, the slice orchestration system may maintain and manage the collected commerce characteristic data of the NFs, which includes, but not limited to, storing, updating, querying and viewing the characteristic data of the NFs, etc.

In one implementation mode of the embodiment of the present disclosure, the network slice orchestration system (equivalent to the slice orchestration system) performs commerce analysis on the commerce characteristics of the corresponding network slices by taking NF as a unit based on the collected commerce characteristic data of the NFs. For example, commerce analysis is performed on an existing network slice. Alternatively, commerce analysis is performed on a simulated network slice, in which, for example, a software commerce characteristic of an NF is associated and integrated with a commerce characteristic of a resource required by the NF, then a commerce characteristic of the NF is generated by simulation, or a commerce characteristic of a slice is generated by simulation, and then commerce analysis is performed on the network slice generated by simulation. Optionally, the network slice orchestration system initiates automatic maintenance processing of the corresponding network slices according to a result of the commerce analysis, for example, triggering extension and reduction of the NFs, triggering slice reorganization, addition and deletion of slice, elimination or termination of a network slice with relatively high deployment cost. If a network slice is terminated, a resource of the related NF may further be released to reduce the cost. Optionally, according to the commerce analysis results, the network slice orchestration system matches and presents a slice, a NF and a resource which meet the requirement relative to a network requirement input by a leasee, such that a slice orchestration suggestion may be given to operation and maintenance staff to make a reasonable judgment during slice orchestration. Through the solution, it is ensured that the orchestrated slice may meet the requirement of the leasee, and it is also ensured that the slice is consistent with the fundamental interest of the operating company in terms of deployment cost.

In one implementation mode of the embodiment of the present disclosure, the MANO automatically generates the commerce characteristic data of the NFs or collects the commerce characteristic data of the NFs, and then performs the data with maintainess and management including, but not limited to, storing, updating, querying and viewing the commerce characteristic data of the NFs, etc.

In one implementation mode of the embodiment of the present disclosure, the NBMF automatically generates the commerce characteristic data of the NFs or collects the commerce characteristic data of the NFs, and then performs the data with maintainess and management including, but not limited to, simulating (associating and integrating the software commerce characteristics of the NFs with the commerce characteristics of the resources required by the NFs and generating the commerce characteristics of the NFs by simulation), storing, updating, querying and viewing the commerce characteristic data of the NFs, etc.

In one implementation mode of the embodiment of the present disclosure, the NBMF reports the commerce characteristic data to a superior network management system (NMS) including, but not limited to, an Element Management System (EMS), an NMS, an OSS and a BSS.

In one implementation mode of the embodiment of the present disclosure, a superior network manager collects the commerce characteristic data of the NFs, and performs the data with maintainess and management including, but not limited to, storing, updating, querying and viewing the commerce characteristic data of the NFs, to provide the superior network manager an approach and capability of reporting the commerce characteristic data of the NFs to the slice orchestration system.

In one implementation mode of the embodiment of the present disclosure, the slice orchestration system collects the commerce characteristic data of the NFs, and performs the data with maintainess and management, including, but not limited to, storing, updating, querying and viewing the commerce characteristic data of the NFs, etc.

In one implementation mode of the embodiment of the present disclosure, the NBMF associates and integrates the software commerce characteristics of the NFs with the commerce characteristics of the resources required by the NFs and generates the commerce characteristics of the NFs by simulation.

In one implementation mode of the embodiment of the present disclosure, the slice orchestration system associates and integrates the software commerce characteristics of the NFs and the commerce characteristics of the resources required by the NFs, and generates the commerce characteristics of the NFs by simulation or generates the commerce characteristics of the slices by simulation.

In one implementation mode of the embodiment of the present disclosure, the NF is a physical NF and/or a virtualization NF.

The optional embodiments mentioned above will be systematically elaborated below in combination with FIGS. 10-28.

Figure 10:
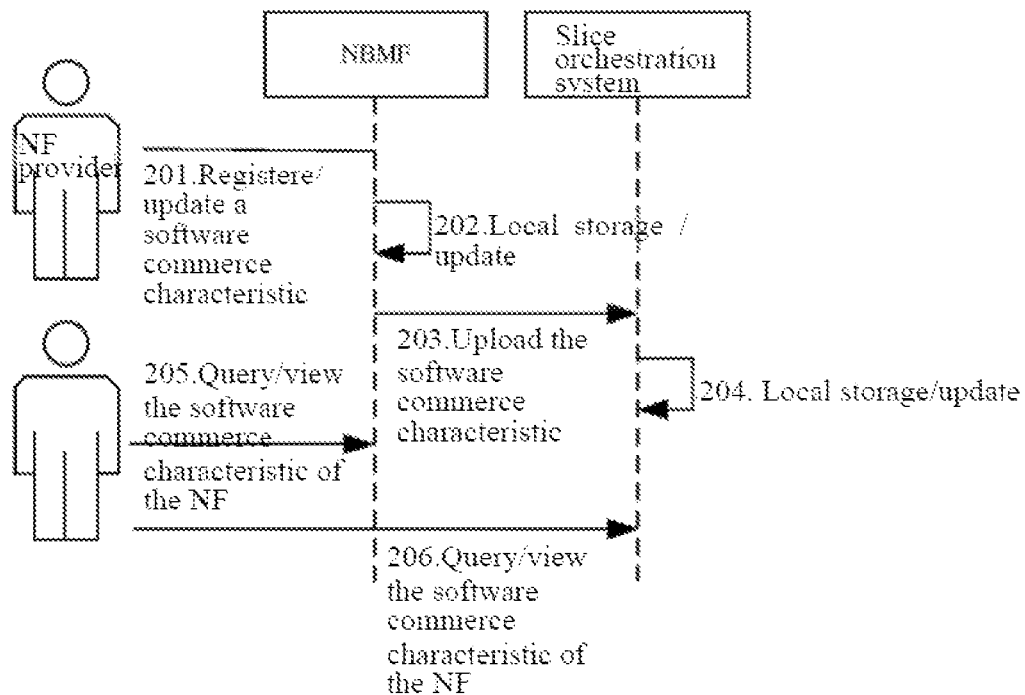
FIG. 10 is a schematic flowchart showing that an NF provider directly registers/updates software commerce characteristic data of an NF in an NBMF and reports the commerce characteristic data according to an embodiment of the present disclosure.

FIG. 10 is a schematic flowchart showing that an NF provider registers/updates software commerce characteristic data of an NF directly in an NBMF, and reports the data according to an embodiment of the present disclosure. The flow includes the following steps.

In Step 201, an NF provider registers/updates a software commerce characteristic of an NF in an NBMF.

In Step 202, the NBMF locally stores or updates the software commerce characteristic of the NF.

In Step 203, the NBMF uploads the software commerce characteristic of the NF to a slice orchestration system.

In Step 204, the slice orchestration system locally stores or updates the software commerce characteristic of the NF.

In Step 205, a client query queries or views from the NBMF for the software commerce characteristic of the NF.

In Step 206, the client query queries or views from the slice orchestration system for the software commerce characteristic of the NF.

Figure 11:
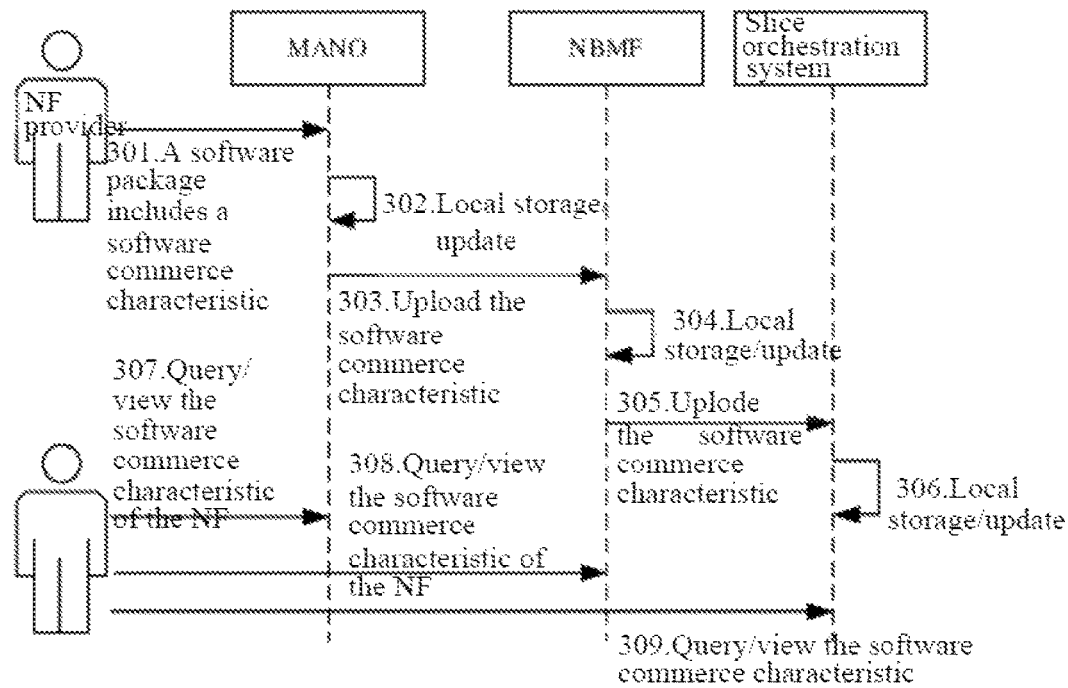
FIG. 11 is a schematic flowchart showing that an NF provider packs software commerce characteristic data of NFs into a version server for reporting uniformly by a Management and Orchestration (MANO) according to an embodiment of the present disclosure.

FIG. 11 is a schematic flowchart showing that an NF provider packs software commerce characteristic data of the NFs into a version server for reporting uniformly by a MANO according to an embodiment of the present disclosure. The flow includes the following steps.

In Step 301, the NF provider uploads a software commerce characteristic of an NF and a software package to a version server of the MANO.

In Step 302, the MANO locally stores or updates the software commerce characteristic of the NF.

In Step 303, the MANO uploads the software commerce characteristic of the NF to the NBMF.

In Step 304, the NBMF locally stores or updates the software commerce characteristic of the NF.

In Step 305, the NBMF uploads the software commerce characteristic of the NF to the slice orchestration system.

In Step 306, the slice orchestration system locally stores or updates the software commerce characteristic of the NF.

In Step 307, a client query queries or views from the MANO for the software commerce characteristic of the NF.

In Step 308, the client query queries or views from the NBMF for the software commerce characteristic of the NF.

In Step 309, the client query queries or views from the slice orchestration system for the software commerce characteristic of the NF.

Figure 12:
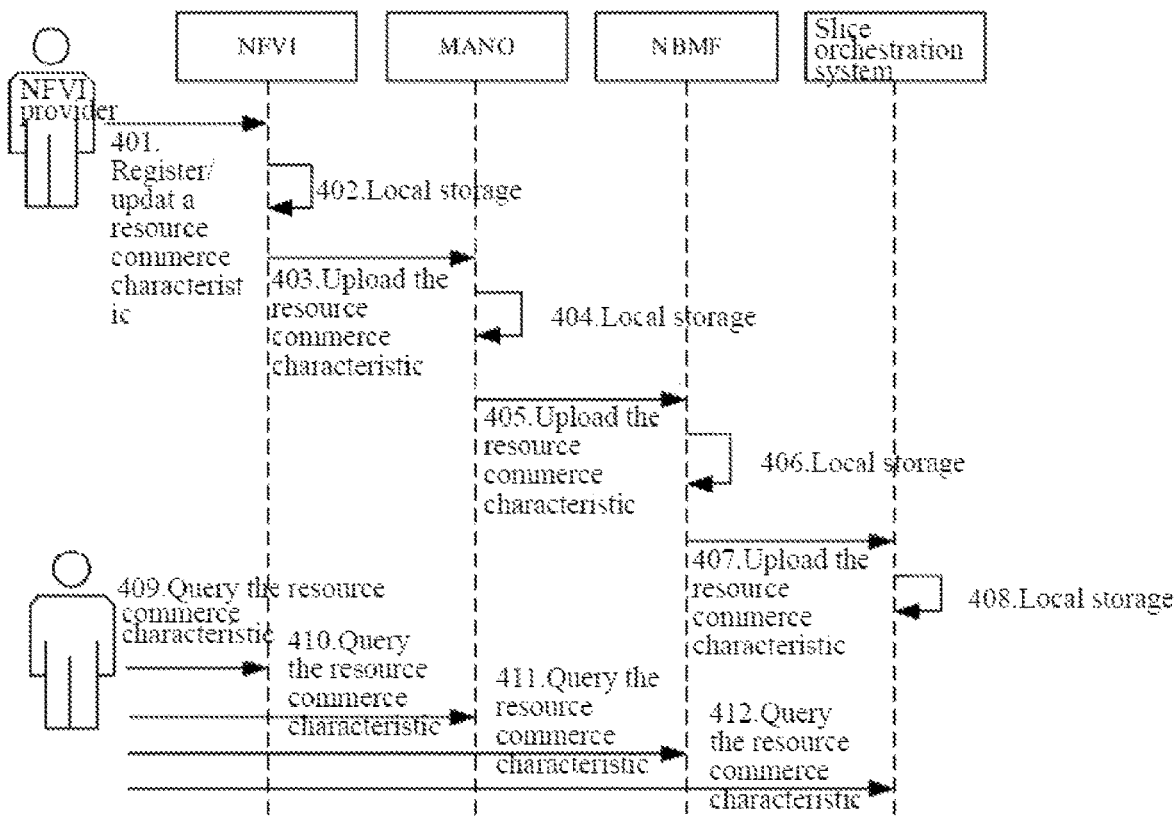
FIG. 12 is a schematic flowchart showing that an NFVI or an NFVI provider registers/updates a resource commerce characteristic data in an NBMF and reports commerce characteristic data according to an embodiment of the present disclosure.

FIG. 12 is a schematic flowchart showing that an NFVI or an NFVI provider registers/updates resource commerce characteristic data in an NBMF and reports the data according to an embodiment of the present disclosure. The flow includes the following steps.

In Step 401, an NFVI provider registers or updates a commerce characteristic of a resource in an NFVI.

In Step 402, the NFVI locally stores or updates the resource commerce characteristic.

In Step 403, the NFVI uploads the resource commerce characteristic to a MANO.

In Step 404, the MANO locally stores or updates the resource commerce characteristic.

In Step 405, the MANO uploads the resource commerce characteristic to an NBMF.

In Step 406, the NBMF locally stores or updates the resource commerce characteristic.

In Step 407, the NBMF uploads the resource commerce characteristic to the slice orchestration system.

In Step 408, the slice orchestration system locally stores or updates the resource commerce characteristic.

In Step 409, a client query queries or views from the VIM for the resource commerce characteristic.

In Step 410, the client query queries or views from the MANO for the resource commerce characteristic.

In Step 411, the client query queries or views from the NBMF for the resource commerce characteristic.

In Step 412, the client query queries or views from the slice orchestration system for the resource commerce characteristic.

Figure 13:
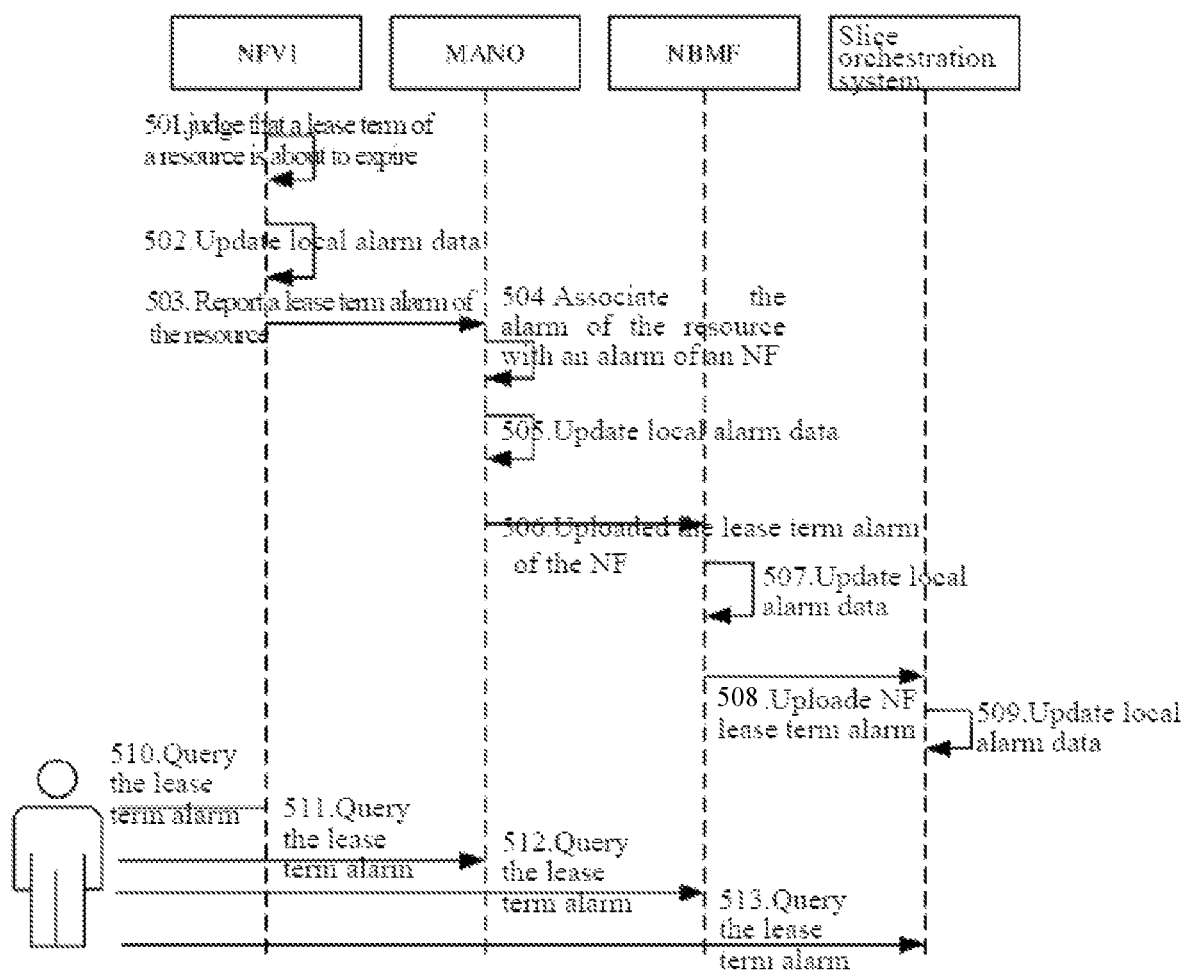
FIG. 13 is a schematic flowchart of reporting a lease term alarm according to an embodiment of the present disclosure.

FIG. 13 is a schematic flowchart of reporting a lease term alarm according to an embodiment of the present disclosure. The flow includes the following steps.

In Step 501, the NFVI identifies that a lease term of a resource is about to expire.

In Step 502, the NFVI updates local resource alarm data.

In Step 503, the NFVI reports a resource alarm to the MANO.

In Step 504, the MANO associates the resource alarm with a specific NF.

In Step 505, the MANO updates local resource alarm data and alarm data of the corresponding NF.

In Step 506, the MANO uploads a lease term alarm of the NF to the NBMF.

In Step 507, the NBMF uploads local NF alarm data.

In Step 508, the NBMF uploads the lease term alarm of the NF to the slice orchestration system.

In Step 509, the slice orchestration system uploads local NF alarm data and alarm data of a corresponding slice.

In Step 510, a client views or queries from the NFVI for the resource alarm.

In Step 511, the client views or queries from the MANO for the alarm of the NF.

In Step 512, the client views or queries from the NBMF for the alarm of the NF.

In Step 513, the client views or queries from the slice orchestration system for the alarms of the NF and the corresponding slice.

Figure 14:
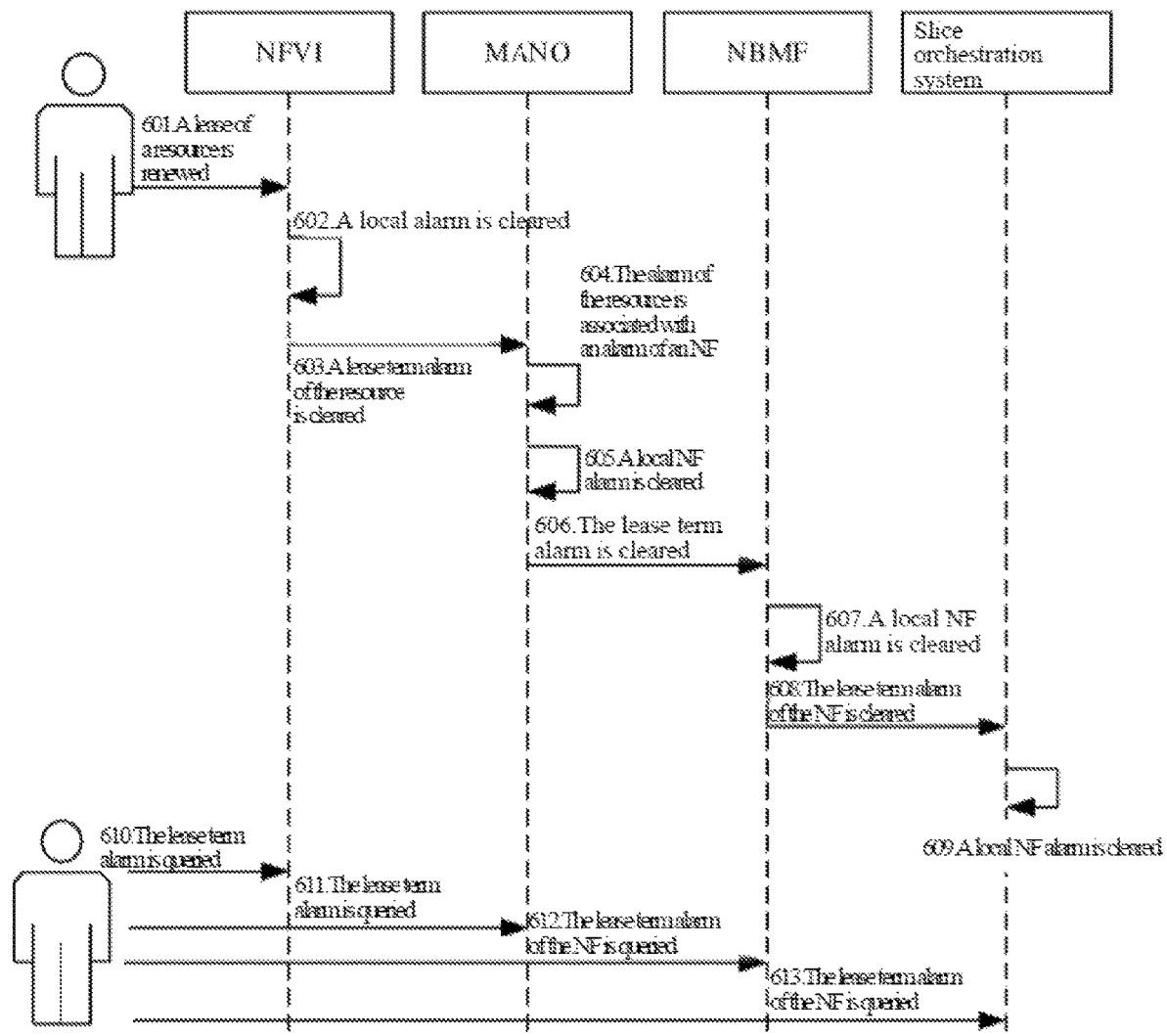
FIG. 14 is a schematic flowchart of clearing a lease term alarm according to an embodiment of the present disclosure.

FIG. 14 is a schematic flowchart of clearing a lease term alarm according to an embodiment of the present disclosure. The flow includes the following steps.

In Step 601, a leasee of the NFVI renews a lease of the resource.

In Step 602, the NFVI clears local resource alarm data.

In Step 603, the NFVI reports a resource alarm clearing message to the MANO.

In Step 604, the MANO associates a resource alarm with a specific NF.

In Step 605, the MANO clears local resource alarm data and alarm data of the corresponding NF.

In Step 606, the MANO clears the NBMF of a lease term alarm of the NF.

In Step 607, the NBMF clears local NF alarm data.

In Step 608, the NBMF uploads the cleared lease term alarm of the NF to the slice orchestration system.

In Step 609, the slice orchestration system clears local NF alarm data and alarm data of a corresponding slice.

In Step 610, a client view or queries from the NFVI for the resource alarm.

In Step 611, the client views or queries from the MANO for the alarm of the NF.

In Step 612, the client views or queries from the NBMF for the alarm of the NF.

In Step 613, the client views or queries from the slice orchestration system for the alarms of the NF and the corresponding slice.

Figure 15:
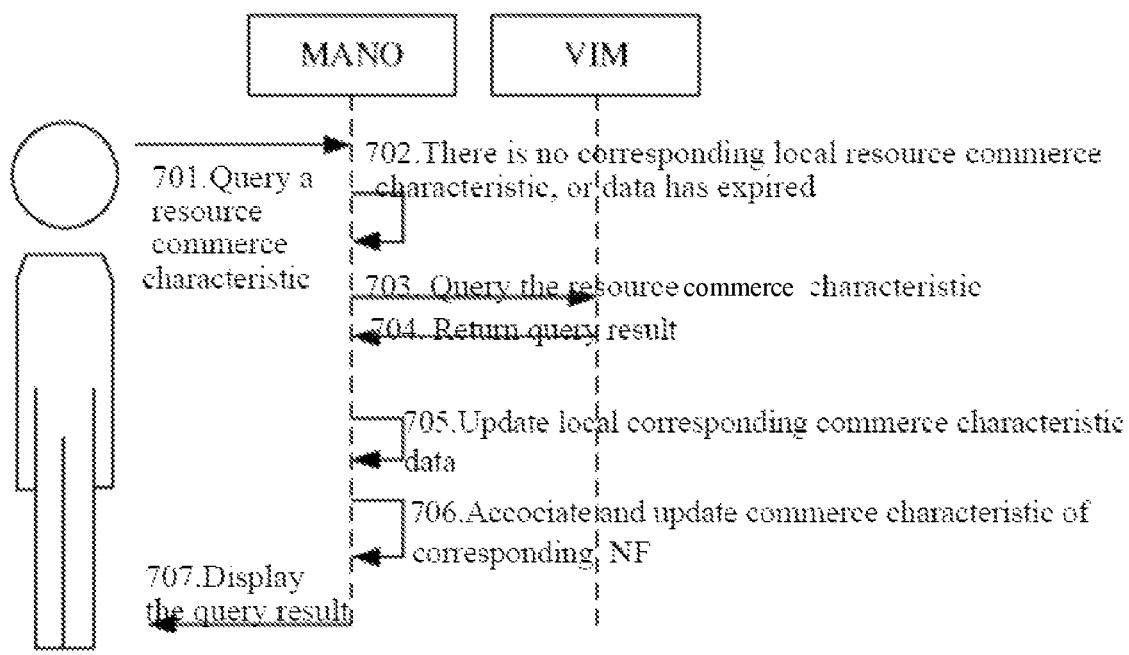
FIG. 15 is a schematic flowchart showing that a MANO queries a resource commerce characteristic from a VIM according to an embodiment of the present disclosure.

FIG. 15 is a schematic flowchart showing that the MANO queries a resource commerce characteristic from the VIM according to an embodiment of the present disclosure. The flow includes the following steps.

In Step 701, a client queries a commerce characteristic of a resource from a MANO.

In Step 702, the MANO has no local commerce characteristic of the queried resource, or locally stored commerce characteristic data of the resource has expired.

In Step 703, the MANO queries the commerce characteristic of the corresponding resource from the VIM.

In Step 704, the VIM returns the commerce characteristic of the corresponding resource to the MANO.

In Step 705, the MANO updates the local commerce characteristic data of the corresponding resource.

In Step 706, the MANO associates and updates commerce characteristic data of an NF that the resource corresponds to.

In Step 707, the MANO displays or returns the commerce characteristic of the resource.

Figure 16:
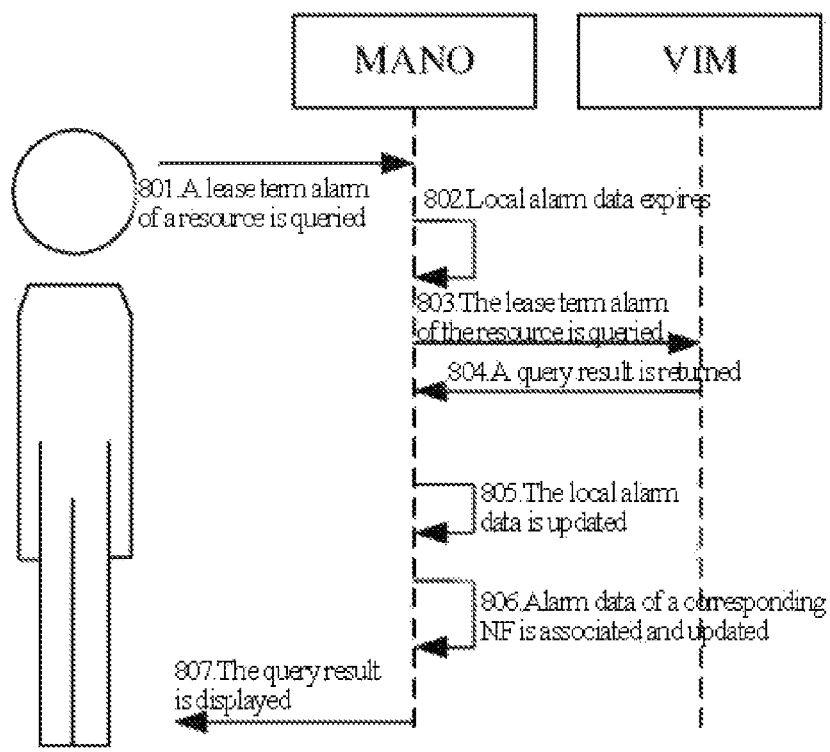
FIG. 16 is a schematic flowchart showing that a MANO queries a lease term alarm of a resource from a VIM according to an embodiment of the present disclosure.

FIG. 16 is a schematic flowchart showing that the MANO queries a lease term alarm of a resource from the VIM according to an embodiment of the present disclosure. The flow includes the following steps.

In Step 801, a client queries a lease term alarm of a resource from the MANO.

In Step 802, the MANO has no local lease term alarm of the queried resource, or locally stored resource alarm data has expired.

In Step 803, the MANO queries the lease term alarm of the corresponding resource from the VIM.

In Step 804, the VIM returns the lease term alarm of the corresponding resource to the MANO.

In Step 805, the MANO updates the local lease term alarm of the corresponding resource.

In Step 806, the MANO associates and updates a lease term alarm of an NF that the resource corresponds to.

In Step 807, the MANO displays or returns the lease term alarm of the resource.

Figure 17:
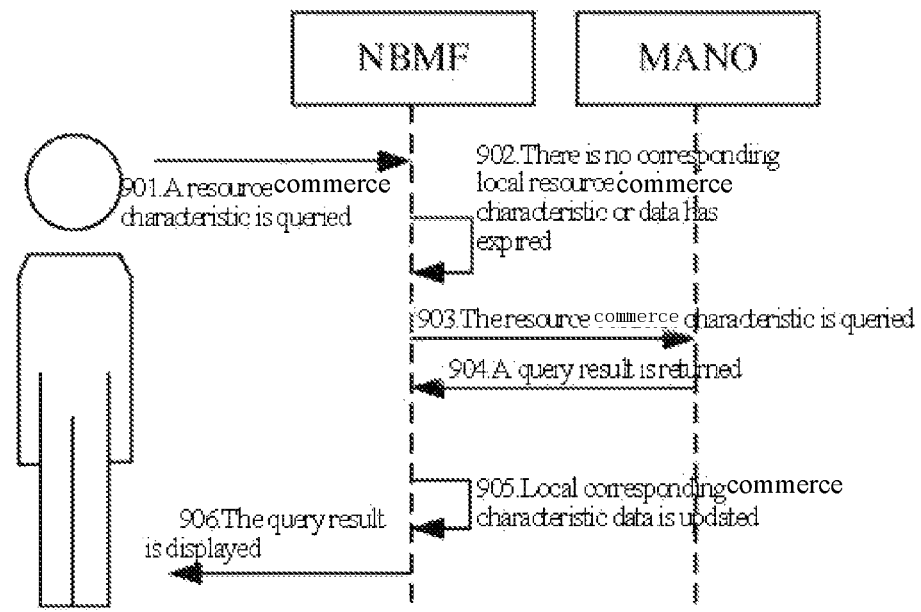
FIG. 17 is a schematic flowchart showing that an NBMF queries a resource commerce characteristic from a MANO according to an embodiment of the present disclosure.

FIG. 17 is a schematic flowchart showing that the NBMF queries a resource commerce characteristic from the MANO according to an embodiment of the present disclosure. The flow includes the following steps.

In Step 901, a client queries a commerce characteristic of a resource from the NBMF.

In Step 902, the NBMF has no local commerce characteristic of the queried resource, or locally stored commerce characteristic data of the resource has expired.

In Step 903, the NBMF queries the commerce characteristic of the resource from the MANO.

In Step 904, the MANO returns the commerce characteristic of the resource to the NBMF.

In Step 905, the NBMF updates local commerce characteristic data of the corresponding resource.

In Step 906, the NBMF displays or returns the commerce characteristic of the resource.

Figure 18:
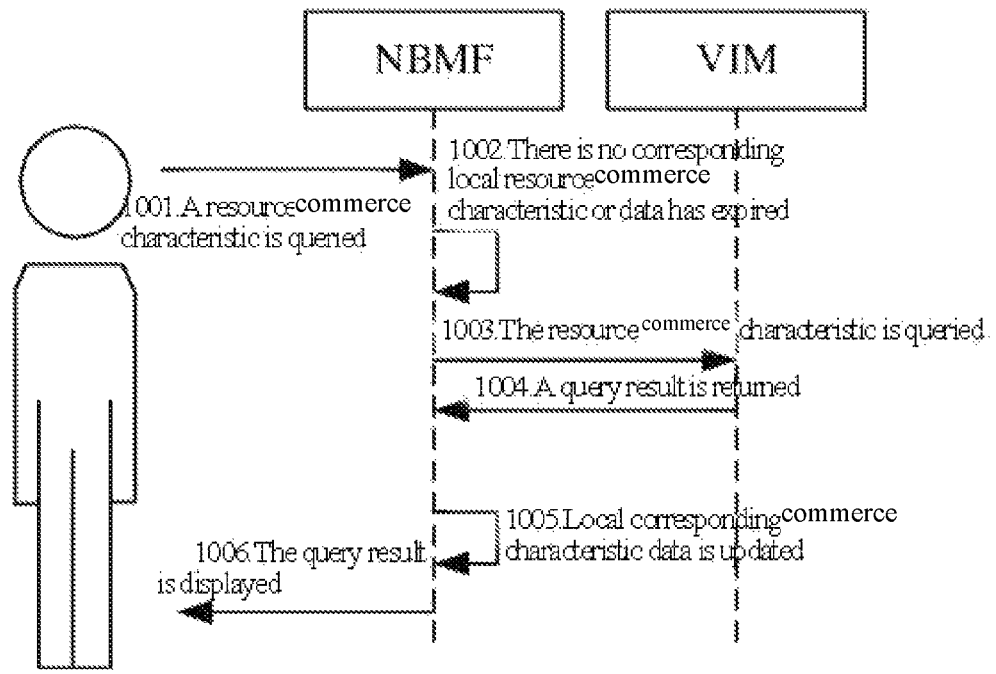
FIG. 18 is a schematic flowchart showing that an NBMF queries a resource commerce characteristic directly from a VIM according to an embodiment of the present disclosure.

FIG. 18 is a schematic flowchart showing that the NBMF queries a resource commerce characteristic directly from the VIM according to an embodiment of the present disclosure. The flow includes the following steps.

In Step 1001, a client queries a commerce characteristic of a resource from the NBMF.

In Step 1002, the NBMF has no local commerce characteristic of the queried resource, or locally stored commerce characteristic data of the resource has expired.

In Step 1003, the NBMF queries the commerce characteristic of the resource from the VIM.

In Step 1004, the VIM returns the commerce characteristic of the resource to the NBMF.

In Step 1005, the NBMF updates local commerce characteristic data of the corresponding resource.

In Step 1006, the NBMF displays or returns the commerce characteristic of the resource.

Figure 19:
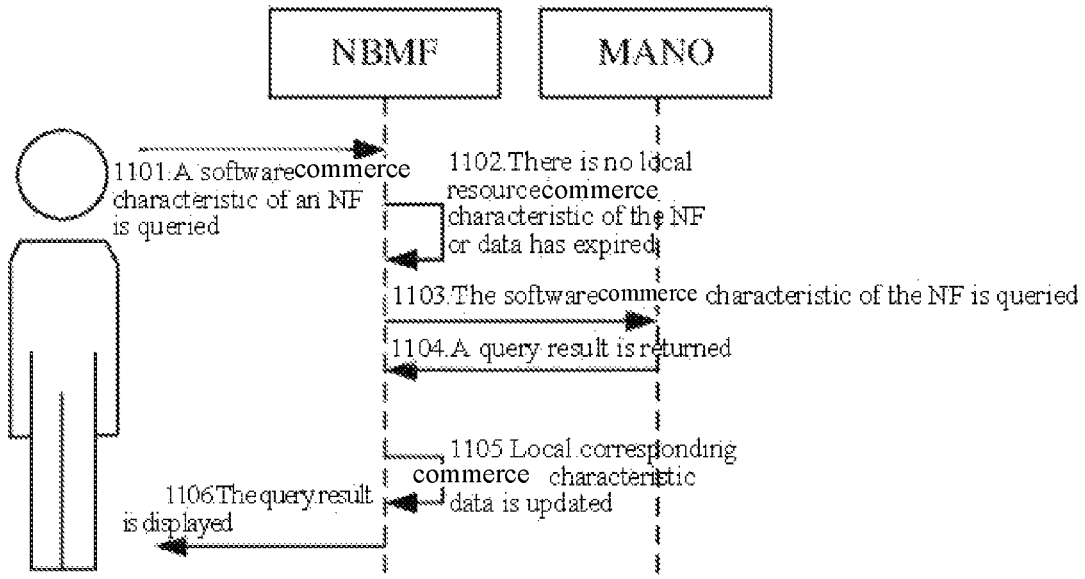
FIG. 19 is a schematic flowchart showing that an NBMF queries a commerce characteristic of NF software from a MANO according to an embodiment of the present disclosure.

FIG. 19 is a schematic flowchart showing that the NBMF queries a commerce characteristic of an NF software from the MANO according to an embodiment of the present disclosure. The flow includes the following steps.

In Step 1101, a client queries a commerce characteristic of an NF software from the NBMF.

In Step 1102, the NBMF has no local commerce characteristic of the queried NF software, or locally stored commerce characteristic data of the NF software has expired.

In Step 1103, the NBMF queries the commerce characteristic of the NF software from the MANO.

In Step 1104, the MANO returns the commerce characteristic of the NF software to the NBMF.

In Step 1105, the NBMF updates local commerce characteristic data of the NF software.

In Step 1106, the NBMF displays or returns the commerce characteristic of the NF software.

Figure 20:
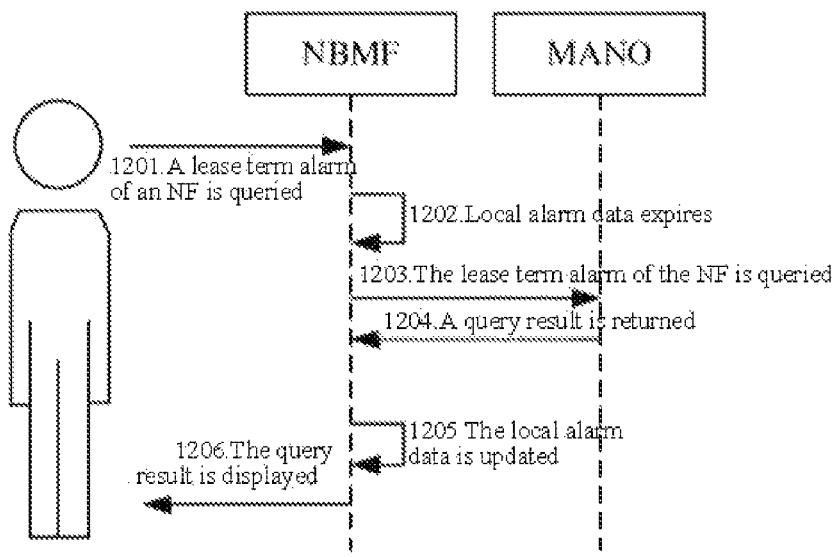
FIG. 20 is a schematic flowchart showing that an NBMF queries a lease term alarm of an NF from a MANO according to an embodiment of the present disclosure.

FIG. 20 is a schematic flowchart showing that the NBMF queries a lease term alarm of an NF from the MANO according to an embodiment of the present disclosure. The flow includes the following steps.

In Step 1201, a client queries a lease term alarm of an NF from the NBMF.

In Step 1202, the NBMF has no local lease term alarm of the queried NF, or locally stored lease term data of the NF has expired.

In Step 1203, the NBMF queries the lease term alarm of the NF from the MANO.

In Step 1204, the MANO returns the lease term alarm of the NF to the NBMF.

In Step 1205, the NBMF updates a local lease term alarm of the NF.

In Step 1206, the NBMF displays or returns the lease term alarm of the NF.

Figure 21:
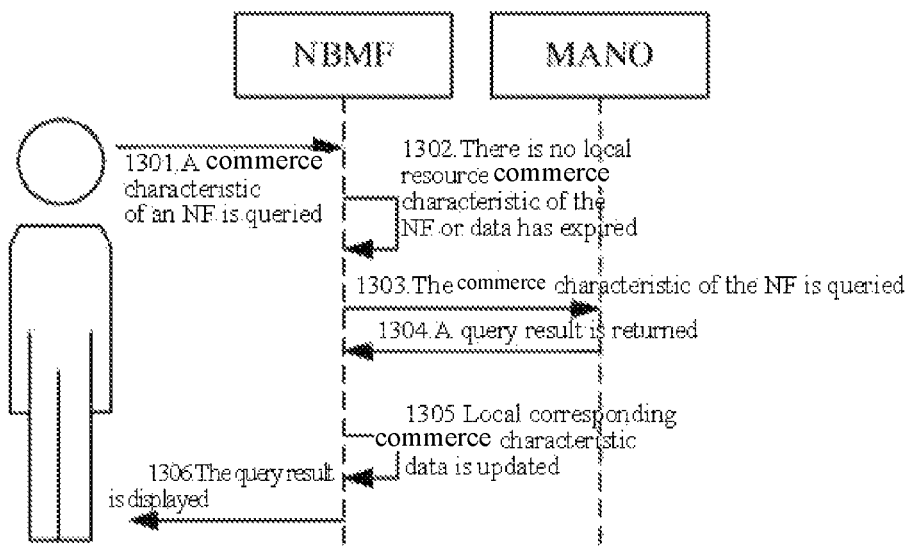
FIG. 21 is a schematic flowchart showing that an NBMF queries a commerce characteristic of an NF that has been deployed from a MANO according to an embodiment of the present disclosure.

FIG. 21 is a schematic flowchart showing that the NBMF queries a commerce characteristic of an NF that has been deployed from a MANO according to an embodiment of the present disclosure. The flow includes the following steps.

In Step 1301, a client queries a commerce characteristic of an NF that has been deployed from the NBMF.

In Step 1302, the NBMF has no local commerce characteristic of the queried NF, or locally stored commerce characteristic data of the NF has expired.

In Step 1303, the NBMF queries the commerce characteristic of the NF that has been deployed from the MANO.

In Step 1304, the MANO returns the commerce characteristic of the NF to the NBMF.

In Step 1305, the NBMF updates the local commerce characteristic data of the NF.

In Step 1306, the NBMF displays or returns the commerce characteristic of the NF.

Figure 22:
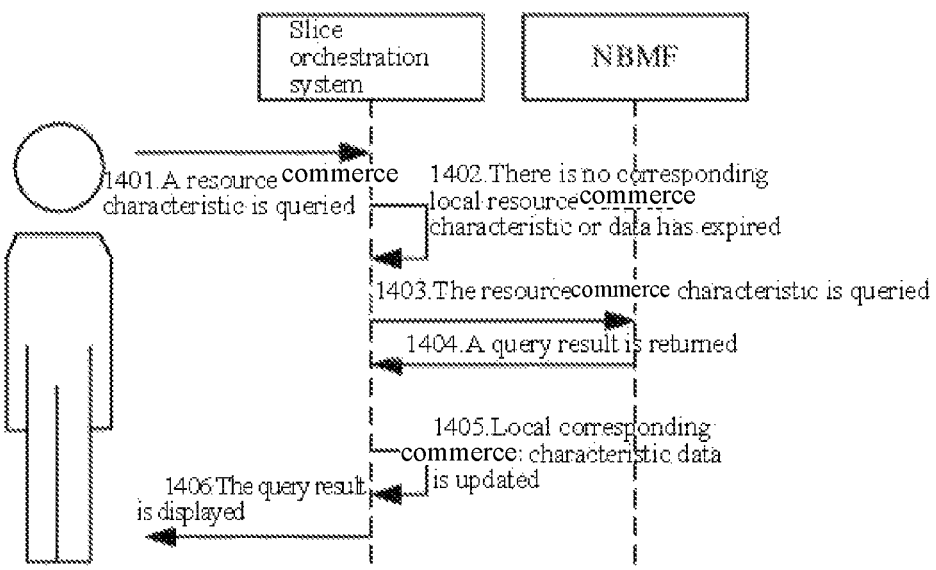
FIG. 22 is a schematic flowchart showing that a slice orchestration system queries a resource commerce characteristic from an NBMF according to an embodiment of the present disclosure.

FIG. 22 is a schematic flowchart showing that the slice orchestration system queries a resource commerce characteristic from the NBMF according to an embodiment of the present disclosure. The flow includes the following steps.

In Step 1401, a client queries a commerce characteristic of a resource from the slice orchestration system.

In Step 1402, the slice orchestration system has no local commerce characteristic of the queried resource, or locally stored commerce characteristic data of the resource has expired.

In Step 1403, the slice orchestration system queries the commerce characteristic of the resource from the NBMF.

In Step 1404, the NBMF returns the commerce characteristic of the resource to the slice orchestration system.

In Step 1405, the slice orchestration system updates the local commerce characteristic data of the corresponding resource.

In Step 1406, the slice orchestration system displays or returns the commerce characteristic of the resource.

Figure 23:
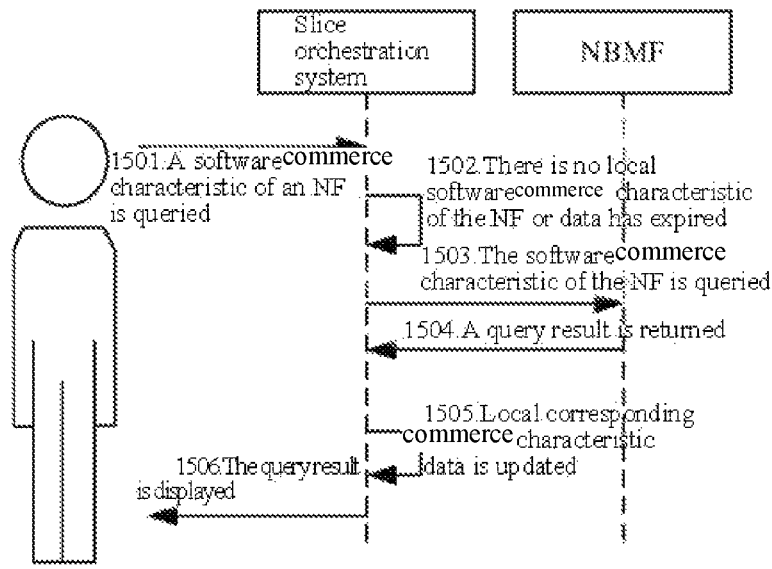
FIG. 23 is a schematic flowchart showing that a slice orchestration system queries a commerce characteristic of NF software from an NBMF according to an embodiment of the present disclosure.

FIG. 23 is a schematic flowchart showing that a slice orchestration system queries a commerce characteristic of NF software from the NBMF according to an embodiment of the present disclosure. The flow includes the following steps.

In Step 1501, a client queries a commerce characteristic of NF software from the slice orchestration system.

In Step 1502, the slice orchestration system has no local commerce characteristic of the queried NF software, or locally stored commerce characteristic data of the NF software has expired.

In Step 1503, the slice orchestration system queries the commerce characteristic of the NF software from the NBMF.

In Step 1504, the NBMF returns the commerce characteristic of the NF software to the slice orchestration system.

In Step 1505, the slice orchestration system updates the local commerce characteristic data of the corresponding NF software.

In Step 1506, the slice orchestration system displays or returns the commerce characteristic of the NF software.

Figure 24:
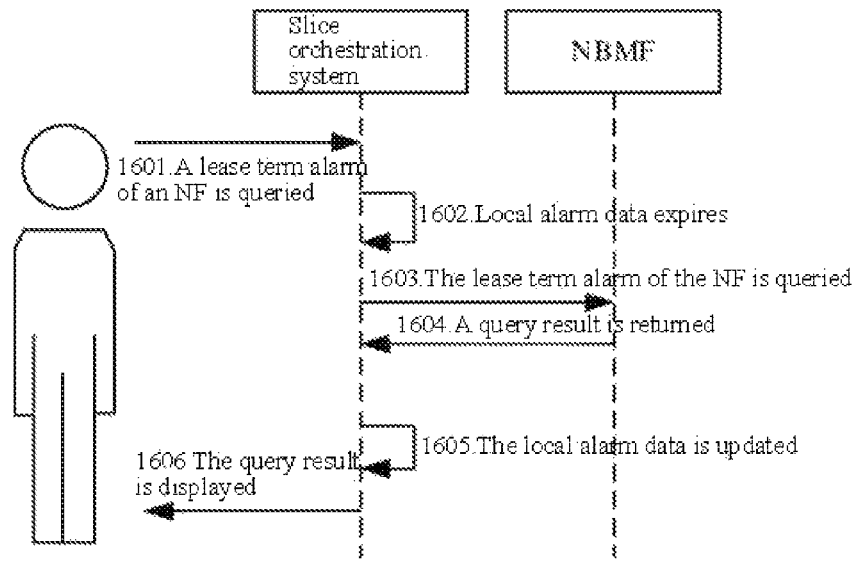
FIG. 24 is a schematic flowchart showing that a slice orchestration system queries a lease term alarm of an NF from an NBMF according to an embodiment of the present disclosure.

FIG. 24 is a schematic flowchart showing that the slice orchestration system queries a lease term alarm of an NF from the NBMF according to an embodiment of the present disclosure. The flow includes the following steps.

In Step 1601, a client queries a lease term alarm of an NF from the slice orchestration system.

In Step 1602, the slice orchestration system has no local lease term alarm of the queried NF, or locally stored lease term data of the NF has expired.

In Step 1603, the slice orchestration system queries the lease term alarm of the NF from the NBMF.

In Step 1604, the NBMF returns the lease term alarm of the NF to the slice orchestration system.

In Step 1605, the slice orchestration system updates a local lease term alarm of the NF.

In Step 1606, the slice orchestration system displays or returns the lease term alarm of the NF.

Figure 25:
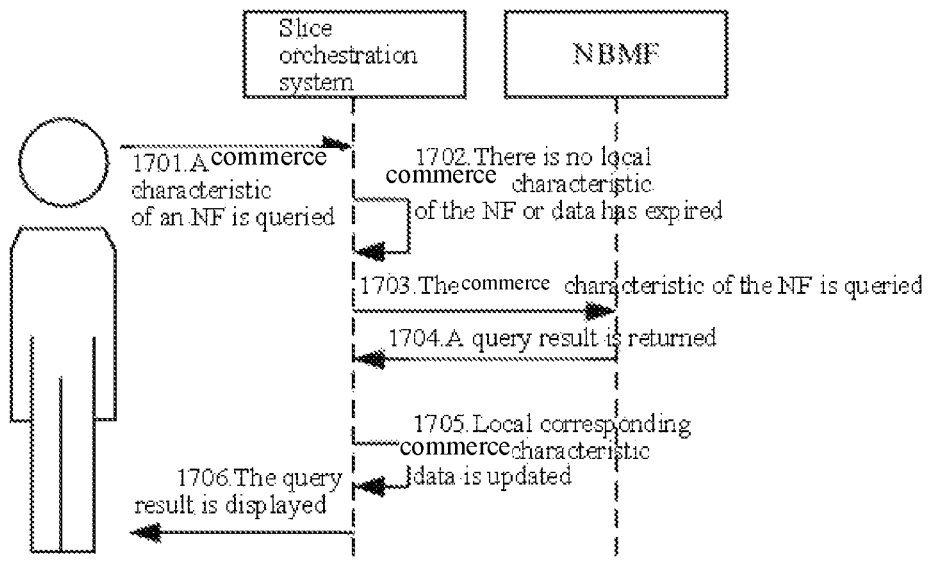
FIG. 25 is a schematic flowchart showing that a slice orchestration system queries a commerce characteristic of an NF that has been deployed from an NBMF according to an embodiment of the present disclosure.

FIG. 25 is a schematic flowchart showing that the slice orchestration system queries a commerce characteristic of an NF that has been deployed from the NBMF according to an embodiment of the present disclosure. The flow includes the following steps.

In Step 1701, a client queries a commerce characteristic of an NF that has been deployed from the slice orchestration system.

In Step 1702, the slice orchestration system has no local commerce characteristic of the queried NF, or locally stored commerce characteristic data of the NF has expired.

In Step 1703, the slice orchestration system queries the commerce characteristic of the NF that has been deployed from the NBMF.

In Step 1704, the NBMF returns the commerce characteristic of the NF to the slice orchestration system.

In Step 1705, the slice orchestration system updates the local commerce characteristic data of the NF.

In Step 1706, the slice orchestration system displays or returns the commerce characteristic of the NF.

Figure 26:
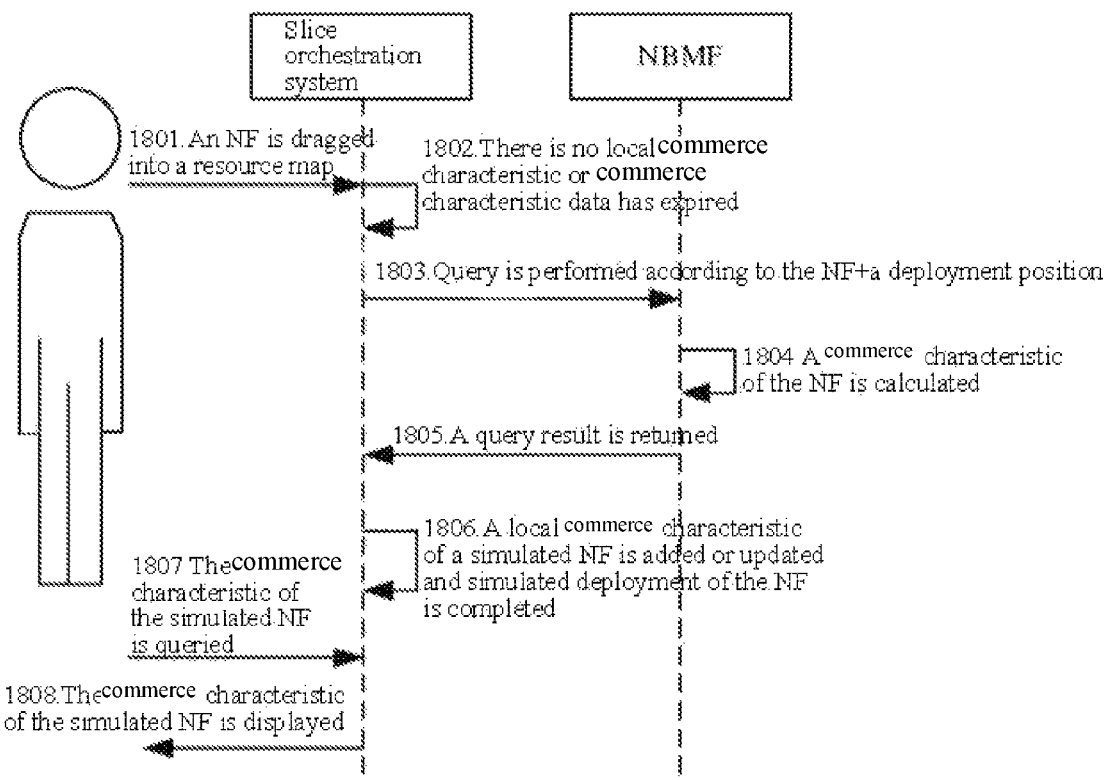
FIG. 26 is a schematic flowchart showing that a slice orchestration system deploys an NF in a simulation manner according to an embodiment of the present disclosure.

FIG. 26 is a schematic flowchart showing that the slice orchestration system deploys an NF in a simulation manner according to an embodiment of the present disclosure. The flow includes the following steps.

In Step 1801, a client drags an NF into a resource map (namely deploying the NF into a specific NFVI in a simulation manner) in the slice orchestration system.

In Step 1802, the slice orchestration system locally has no software commerce characteristic of the NF said in the previous step 1801 and has no commerce characteristic of a resource deployed in the simulation manner either, or locally stored commerce characteristic data has expired.

In Step 1803, the slice orchestration system queries a commerce characteristic of the NF deployed in the simulation manner from an NBMF (namely querying according to the software commerce characteristic of the NF and the commerce characteristic of the resource deployed in the simulation manner).

In Step 1804, the NBMF calculates, by simulation, the commerce characteristic of the NF in combination with the NF and the resource mentioned in the previous step.

In Step 1805, the NBMF returns the commerce characteristic of the simulated NF to the slice orchestration system.

In Step 1806, the slice orchestration system adds or updates local commerce characteristic data of the simulated NF to complete simulated deployment of the NF.

In Step 1807, the client queries the commerce characteristic of the simulated NF from the slice orchestration system.

In Step 1808, the slice orchestration system displays or returns the commerce characteristic of the simulated NF.

Figure 27:
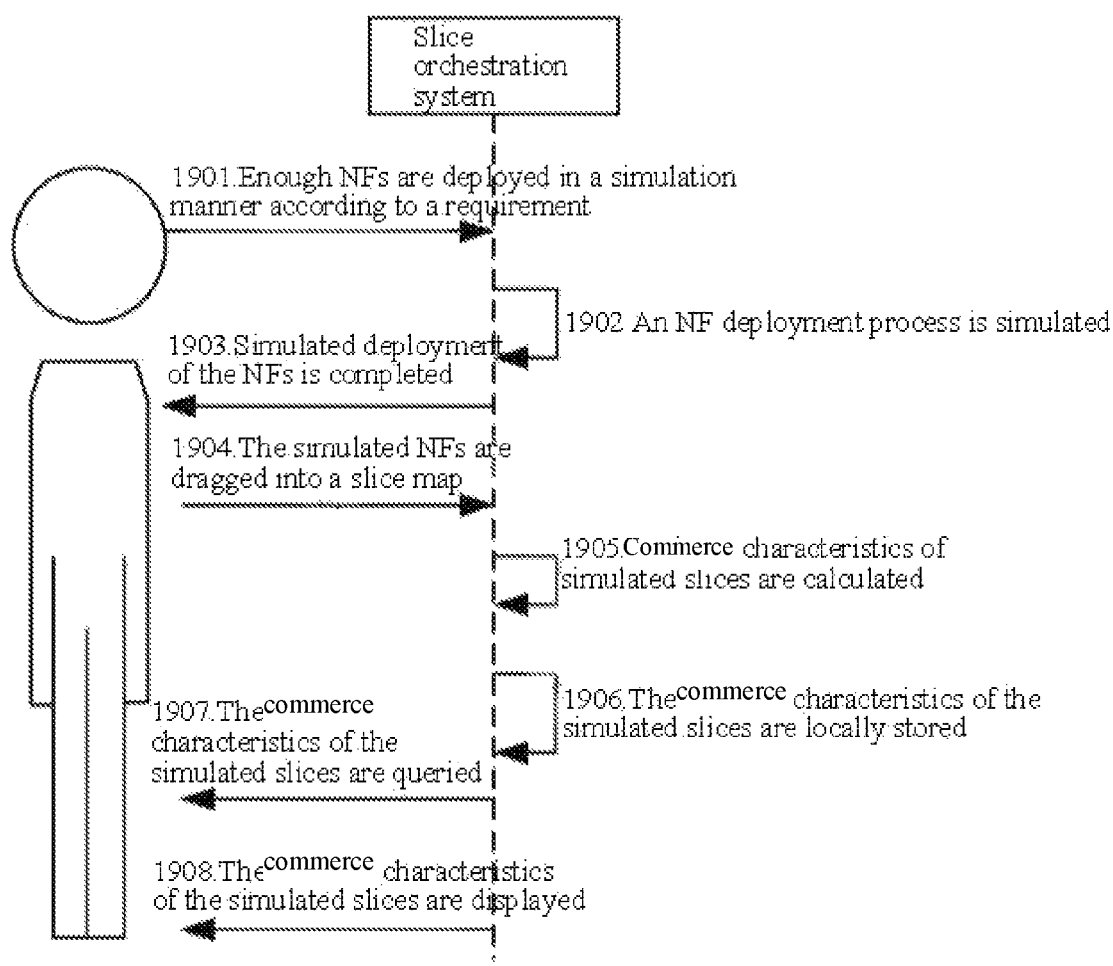
FIG. 27 is a schematic flowchart showing that a slice orchestration system deploys a slice in a simulation manner and calculates a commerce characteristic thereof according to an embodiment of the present disclosure.

FIG. 27 is a schematic flowchart showing that the slice orchestration system deploys a slice in a simulation manner and calculates a commerce characteristic thereof according to an embodiment of the present disclosure. The flow includes the following steps.

In Step 1901, a client operates the slice orchestration system to deploy, in a simulation manner, enough NFs according to a requirement.

In Step 1902, the slice orchestration system simulates an NF deployment process (See the specific process refers to embodiment 17).

In Step 1903, the slice orchestration system completes simulated deployment of the NFs.

In Step 1904, the client operates the slice orchestration system to drag the simulated NFs into a slice map.

In Step 1905, the slice orchestration system calculates commerce characteristics of slices by simulation.

In Step 1906, the slice orchestration system locally stores the calculated commerce characteristics of the simulated slices.

In Step 1907, the client queries the commerce characteristics of the simulated slices from the slice orchestration system.

In Step 1908, the slice orchestration system displays or returns the commerce characteristics of the simulated slices.

Figure 28:
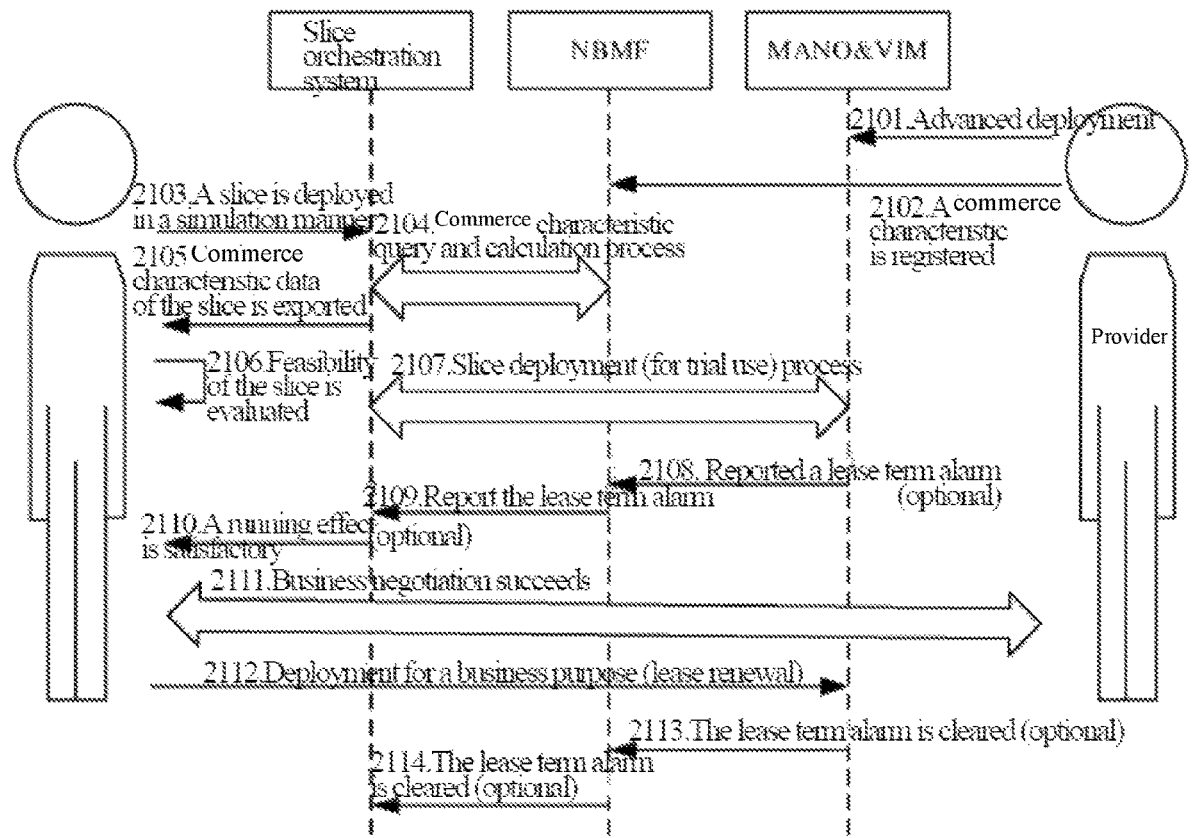
FIG. 28 is a schematic flowchart of deploying a slice in a simulation manner and using it for a business purpose instead according to an embodiment of the present disclosure.

FIG. 28 is a schematic flowchart of deploying a slice in a simulation manner and using it for a business purpose instead according to an embodiment of the present disclosure. The flow includes the following steps.

In Step 2101, a resource provider reaches an agreement with an operating company, and the resource provider deploys a resource in advance.

In Step 2102, the resource provider and a provider of an NF register respective commerce characteristics in the NBMF (or providing the commerce characteristics for the NBMF through another approach).

In Step 2103, the operating company operates the slice orchestration system to deploy a slice in a simulation manner (See a specific process of embodiment 18).

In Step 2104, the slice orchestration system queries and calculates the commerce characteristics of the NF and the resource from the NBMF.

In Step 2105, the operating company exports a simulated commerce characteristic of the slice.

In Step 2106, the operating company internally evaluates the feasibility of the slice.

In Step 2107, the slice orchestration system completes a trial deployment of the slice through the MANO and the VIM.

In Step 2108, (if a trial period is about to expire) the MANO and the VIM report a lease term alarm to the NBMF.

In Step 2109, (if a trial period is about to expire) the NBMF reports the lease term alarm to the slice orchestration system.

In Step 2110, the operating company evaluates that an outcome of the trial running of the slice is satisfactory.

In Step 2111, the operating company performs business negotiation with the providers (including the resource provider and the NF provider) according to the commerce characteristic of the simulated slice and the trial running outcome.

In Step 2112, if commerce negotiation succeeds, the operating company turns the trial deployment into a business deployment (or called lease renewal).

In Step 2113, (if a lease term alarm is generated at an early stage) the MANO and the VIM clear the NBMF of the lease term alarm.

In Step 2114, (if the lease term alarm is generated at the early stage) the NBMF clears the slice orchestration system of the lease term alarm.

Through the above descriptions about the implementation modes, those skilled in the art may clearly know that the method according to the embodiment may be implemented in a manner of combining software and a necessary universal hardware platform, and of course, may also be implemented through hardware, but the former is a preferred implementation mode under many circumstances. Based on such an understanding, the technical solutions of the present disclosure substantially or parts making contributions to the conventional art may be embodied in form of software product, and the computer software product is stored in a storage medium (for example, a Read-Only Memory (ROM)/RAM, a magnetic disk and an optical disk), including a plurality of instructions configured to enable a terminal device (which may be a mobile phone, a computer, a server, a network device or the like) to execute the method in each embodiment of the present disclosure.

Embodiment 2

The embodiment also provides a commerce characteristic data reporting device and a network slice orchestration device. The devices are configured to implement the above-mentioned embodiment and preferred implementation modes. What has been described will not be elaborated. For example, term "module", used below, may be a combination of software and/or hardware capable of realizing a preset function. Although the devices described in the following embodiment are preferably implemented with software, implementation with hardware or a combination of the software and the hardware is also possible and conceivable.

Figure 29:
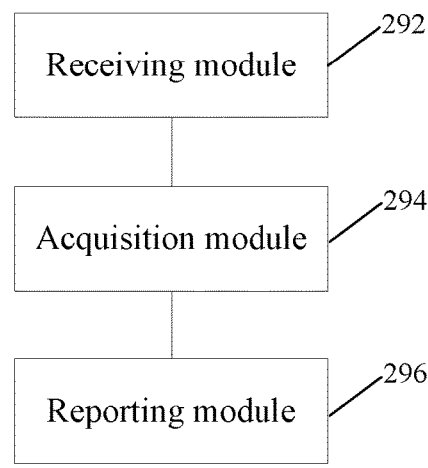
FIG. 29 is a block diagram of a structure of a commerce characteristic data reporting device according to an embodiment of the present disclosure.

FIG. 29 is a structure block diagram of a commerce characteristic data reporting device according to an embodiment of the present disclosure. As shown in FIG. 29, the device includes:

a receiving module 292, configured to receive software commerce characteristic data of VNFs from a VNFM and receive resource commerce characteristic data of the VNFs from a VIM;

an acquisition module 294, coupled to the receiving module 292 and configured to acquire commerce characteristic data of the VNFs according to the software commerce characteristic data and the resource commerce characteristic data; and a reporting module 296, coupled to the acquisition module 294 and configured to report the commerce characteristic data of the VNFs to a slice orchestration system, the commerce characteristic data of the VNFs being configured for the slice orchestration system to orchestrate network slices.

In one implementation mode of the embodiment of the present disclosure, the acquisition module 294 is further configured to integrate software commerce characteristic data of a VNF that has been deployed in the VNFs with resource commerce characteristic data required by the software commerce characteristic data of the VNF that has been deployed to acquire commerce characteristic data of the VNF that has been deployed, the software commerce characteristic data of the VNF that has been deployed in the VNFs being included in the software commerce characteristic data, and the resource commerce characteristic data required by the software commerce characteristic data of the VNF that has been deployed being included in the resource commerce characteristic data; and to integrate software commerce characteristic data of a VNF that has not been deployed in the VNFs and resource commerce characteristic data required by the software commerce characteristic data of the VNF that has not been deployed to acquire commerce characteristic data of the VNF that has not been deployed, the software commerce characteristic data of the VNF that has not been deployed in the VNFs being included in the software commerce characteristic data, and the resource commerce characteristic data required by the software commerce characteristic data of the VNF that has not been deployed being included in the resource commerce characteristic data.

In one implementation mode of the embodiment of the present disclosure, the reporting module 296 is further configured to, subsequent to the commerce characteristic data of the VNFs is reported to the slice orchestration system, receive lease term alarm information of the VNF that has been deployed; and to report the lease term alarm information to the slice orchestration system, the lease term alarm information being configured for the slice orchestration system to orchestrate the network slices.

Figure 30:
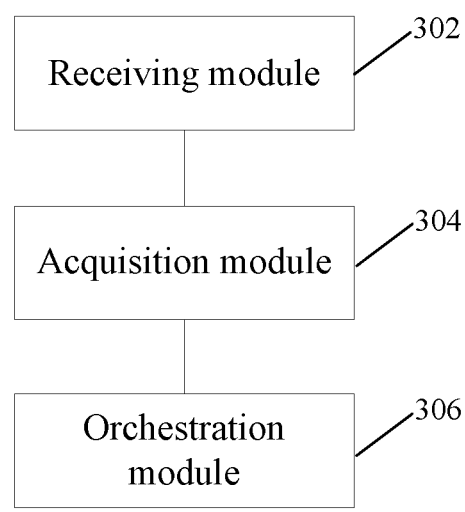
FIG. 30 is a block diagram of a structure of a network slice orchestration device according to an embodiment of the present disclosure.

FIG. 30 is a structure block diagram of a network slice orchestration device according to an embodiment of the present disclosure. As shown in FIG. 30, the device includes:

a receiving module 302, configured to receive commerce characteristic data of VNFs reported by the NBMF;

an acquisition module 304, coupled to the receiving module 302 and configured to acquire network characteristic data of the VNFs required by a user; and an orchestration module 306, coupled to the acquisition module 304 and configured to orchestrate network slices according to the commerce characteristic data of the VNFs and the network characteristic data of the VNFs.

In one implementation mode of the embodiment of the present disclosure, the orchestration module 306 is further configured to receive lease term alarm information of a VNF that has been deployed in the VNFs that is reported by the NBMF; and to orchestrate the network slices according to the lease term alarm information, the commerce characteristic data of the VNFs and the network characteristic data of the VNFs.

It is to be noted that each of the modules may be implemented through software or hardware, and the latter may be implemented in, but not limited to, the following manner: all the modules are located in the same processor, or any of these modules may be freely combined and located in different processors.

Embodiment 3

The embodiment of the present disclosure also provides a storage medium including a stored program which, when running, carries out any of the abovementioned methods.

In one implementation mode of the embodiment of the present disclosure, in the embodiment, the storage medium may be set to store a program code configured to execute the following steps:

S1: software commerce characteristic data of VNFs is received from a VNFM, and resource commerce characteristic data of the VNFs is received from a VIM;

S2: commerce characteristic data of the VNFs is acquired according to the software commerce characteristic data and the resource commerce characteristic data; and S3: the commerce characteristic data of the VNFs is reported to a slice orchestration system, the commerce characteristic data of the VNFs being configured for the slice orchestration system to orchestrate network slices.

In one implementation mode of the embodiment of the present disclosure, the storage medium may be set to store a program code configured to execute the following step:

S1: the commerce characteristic data of the VNFs includes commerce characteristic data of a VNF that has been deployed and commerce characteristic data of a VNF that has not been deployed.

In one implementation mode of the embodiment of the present disclosure, the storage medium is further set to store a program code configured to execute the following steps: the operation that the commerce characteristic data of the VNFs is acquired according to the software commerce characteristic data and the resource commerce characteristic data includes:

S1: software commerce characteristic data of the VNF that has been deployed in the VNFs is integrated with resource commerce characteristic data required by the software commerce characteristic data of the VNF that has been deployed to acquire the commerce characteristic data of the VNF that has been deployed, the software commerce characteristic data of the VNF that has been deployed in the VNFs being included in the software commerce characteristic data, and the resource commerce characteristic data required by the software commerce characteristic data of the VNF that has been deployed being included in the resource commerce characteristic data; and S2: software commerce characteristic data of the VNF that has not been deployed in the VNFs is integrated with resource commerce characteristic data required by the software commerce characteristic data of the VNF that has not been deployed to acquire the commerce characteristic data of the VNF that has not been deployed, the software commerce characteristic data of the VNF that has not been deployed in the VNFs being included in the software commerce characteristic data, and the resource commerce characteristic data required by the software commerce characteristic data of the VNF that has not been deployed being included in the resource commerce characteristic data.

In one implementation mode of the embodiment of the present disclosure, the storage medium is further set to store a program code configured to execute the following steps: after the commerce characteristic data of the VNFs is reported to the slice orchestration system, the following steps are further included:

S1: lease term alarm information of the VNF that has been deployed is received; and S2: the lease term alarm information is reported to the slice orchestration system, the lease term alarm information being configured for the slice orchestration system to orchestrate the network slices.

In one implementation mode of the embodiment of the present disclosure, the storage medium is further set to store a program code configured to execute the following steps: the operation that the commerce characteristic data of the VNFs is reported to the slice orchestration system includes:

S1: a query request of querying the commerce characteristic data of the VNFs is received from the slice orchestration system;

S2: the commerce characteristic data of the VNFs is locally retrieved according to the query request; and S3: the queried commerce characteristic data of the VNFs is reported to the slice orchestration system.

The embodiment of the present disclosure also provides a storage medium including a stored program which, when running, carries out any of the abovementioned methods.

In one implementation mode of the embodiment of the present disclosure, in the embodiment, the storage medium may be set to store a program code configured to execute the following steps:

S1: commerce characteristic data of VNFs reported by the NBMF is received;

S2: network characteristic data of the VNFs that is required by a user is acquired; and S3: network slices are orchestrated according to the commerce characteristic data of the VNFs and the network characteristic data of the VNFs.

In one implementation mode of the embodiment of the present disclosure, the storage medium is further set to store a program code configured to execute the following steps: the operation that the network slices are orchestrated according to the commerce characteristic data of the VNFs and the network characteristic data of the VNFs includes:

S1: lease term alarm information of a VNF that has been deployed in the VNFs that is reported by the NBMF is received; and S2: the network slices are orchestrated according to the lease term alarm information, the commerce characteristic data of the VNFs and the network characteristic data of the VNFs.

In one implementation mode of the embodiment of the present disclosure, the storage medium is further set to store a program code configured to execute the following steps: the operation that the commerce characteristic data of the VNFs that is reported by the NBMF is received includes:

S1: a query request of querying the commerce characteristic data of the VNFs is sent to the NBMF; and S2: response information with which the NBMF responds to the query request is received, the response information containing the commerce characteristic data of the VNFs.

In one implementation mode of the embodiment of the present disclosure, in the embodiment, the storage medium may include, but not limited to, various media capable of storing program codes such as a U disk, a ROM, a RAM, a mobile hard disk, a magnetic disk or an optical disk.

The embodiment of the present disclosure also provides a processor which is configured to run a program, and the program, when running, carries out the steps in any of the abovementioned methods.

In one implementation mode of the embodiment of the present disclosure, in the embodiment, the program is configured to execute the following steps:

S1: software commerce characteristic data of VNFs is received from a VNFM, and resource commerce characteristic data of the VNFs is received from a VIM;

S2: commerce characteristic data of the VNFs is acquired according to the software commerce characteristic data and the resource commerce characteristic data; and S3: the commerce characteristic data of the VNFs is reported to a slice orchestration system, the commerce characteristic data of the VNFs being configured for the slice orchestration system to orchestrate network slices.

In one implementation mode of the embodiment of the present disclosure, in the embodiment, the program is configured to execute the following step:

S1: the commerce characteristic data of the VNFs includes commerce characteristic data of a VNF that has been deployed and commerce characteristic data of a VNF that has not been deployed.

In one implementation mode of the embodiment of the present disclosure, in the embodiment, the program is configured to execute the following steps: the operation that the commerce characteristic data of the VNFs is acquired according to the software commerce characteristic data and the resource commerce characteristic data includes:

S1: software commerce characteristic data of the VNF that has been deployed in the VNFs is integrated with resource commerce characteristic data required by the software commerce characteristic data of the VNF that has been deployed to acquire the commerce characteristic data of the VNF that has been deployed, the software commerce characteristic data of the VNF that has been deployed in the VNFs being included in the software commerce characteristic data, and the resource commerce characteristic data required by the software commerce characteristic data of the VNF that has been deployed being included in the resource commerce characteristic data; and S2: software commerce characteristic data of the VNF that has not been deployed in the VNFs is integrated with resource commerce characteristic data required by the software commerce characteristic data of the VNF that has not been deployed to acquire the commerce characteristic data of the VNF that has not been deployed, the software commerce characteristic data of the VNF that has not been deployed in the VNFs being included in the software commerce characteristic data, and the resource commerce characteristic data required by the software commerce characteristic data of the VNF that is not deployed being included in the resource commerce characteristic data.

In one implementation mode of the embodiment of the present disclosure, in the embodiment, the program is configured to execute the following steps: after the commerce characteristic data of the VNFs is reported to the slice orchestration system, the following steps are further included:

S1: lease term alarm information of the VNF that has been deployed is received; and S2: the lease term alarm information is reported to the slice orchestration system, the lease term alarm information being configured for the slice orchestration system to orchestrate the network slices.

In one implementation mode of the embodiment of the present disclosure, in the embodiment, the program is configured to execute the following steps: the operation that the commerce characteristic data of the VNFs is reported to the slice orchestration system includes:

S1: a query request of querying the commerce characteristic data of the VNFs is received from the slice orchestration system;

S2: the commerce characteristic data of the VNFs is locally queried according to the query request; and S3: the queried commerce characteristic data of the VNFs is reported to the slice orchestration system.

In one implementation mode of the embodiment of the present disclosure, in the embodiment, the program is configured to execute the following steps:

S1: commerce characteristic data of VNFs reported by the NBMF is received;

S2: network characteristic data of the VNFs that is required by a user is acquired; and S3: network slices are orchestrated according to the commerce characteristic data of the VNFs and the network characteristic data of the VNFs.

In one implementation mode of the embodiment of the present disclosure, in the embodiment, the program is configured to execute the following steps: the operation that the network slices are orchestrated according to the commerce characteristic data of the VNFs and the network characteristic data of the VNFs includes:

S1: lease term alarm information of a VNF that has been deployed in the VNFs that is reported by the NBMF is received; and S2: the network slices are orchestrated according to the lease term alarm information, the commerce characteristic data of the VNFs and the network characteristic data of the VNFs.

In one implementation mode of the embodiment of the present disclosure, in the embodiment, the program is configured to execute the following steps: the operation that the commerce characteristic data of the VNFs reported by the NBMF is received includes:

S1: a query request of querying the commerce characteristic data of the VNFs is sent to the NBMF; and S2: response information with which the NBMF responds to the query request is received, the response information containing the commerce characteristic data of the VNFs.

In one implementation mode of the embodiment of the present disclosure, specific examples in the embodiment may refer to the examples described in the abovementioned embodiments and optional implementation modes and will not be elaborated in the embodiment.

It is apparent that those skilled in the art should know that each module or each step of the present disclosure may be implemented by a universal computing device, and the modules or steps may be concentrated in a single computing device or distributed in a network formed by multiple computing devices and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the present disclosure is not limited to any specific hardware and software combination.

The above is only the preferred embodiment of the present disclosure and not intended to limit the present disclosure. Those skilled in the art may make various modifications and variations to the present disclosure. Any modifications, equivalent replacements, improvements and the like made within the principle of the present disclosure shall fall within the scope of protection of the present disclosure.

INDUSTRIAL APPLICABILITY

With adoption of the embodiments of the present disclosure, the software commerce characteristic data of the VNFs is received from the VNFM, and the resource commerce characteristic data of the VNFs is received from the VIM; the commerce characteristic data of the VNFs is acquired according to the software commerce characteristic data and the resource commerce characteristic data; and the commerce characteristic data of the VNFs is reported to the slice orchestration system, the commerce characteristic data of the VNFs being configured for the slice orchestration system to orchestrate the network slices. As a result of that the commerce characteristic data of the VNFs is acquired according to the software commerce characteristic data of the VNFs that is reported by the VNFM and the resource commerce characteristic data of the VNFs that is reported by the VIM and then the commerce characteristic data is reported to the slice orchestration system, the slice orchestration system may orchestrate the network slices according to the commerce characteristic data of the VNFs, and reduction in the deployment cost of an operating company is ensured. Therefore, the problem in the related art that a slice orchestration system is incapable of knowing about a commerce characteristic of an NF such that an orchestrated slice may not ensure effectiveness in the deployment cost of an operating company may be solved, and the effect of reducing the deployment cost may be achieved.

What is claimed is:

1. A method for commerce characteristic data reporting and network slice orchestration, comprising:

receiving software commerce characteristic data of Virtualization Network Functions (VNFs) from a VNF Manager (VNFM), and receiving resource commerce characteristic data of the VNFs from a Virtualization Infrastructure Manager (VIM);

acquiring commerce characteristic data of the VNFs according to the received software commerce characteristic data and the received resource commerce characteristic data wherein the commerce characteristic data of the VNFs comprises commerce characteristic data of a VNF that has been deployed and commerce characteristic data of a VNF that has not been deployed;

reporting the commerce characteristic data of the VNFs to a slice orchestration system;

acquiring network characteristic data of the VNFs that is required by a user;

receiving a lease term alarm information of the VNF that has been deployed, and reporting the lease term alarm information to the slice orchestration system;

orchestrating network slices by the slice orchestration system according to the lease term alarm information, the commerce characteristic data of the VNFs and the network characteristic data of the VNFs; and clearing the lease term alarm information from the slice orchestration system.

2. The method according to claim 1, wherein acquiring the commerce characteristic data of the VNFs according to the software commerce characteristic data and the resource commerce characteristic data includes:

integrating software commerce characteristic data of the VNF that has been deployed in the VNFs with resource commerce characteristic data required by the software commerce characteristic data of the VNF that has been deployed to acquire the commerce characteristic data of the VNF that has been deployed, wherein the software commerce characteristic data of the VNF that has been deployed in the VNFs is included in the software commerce characteristic data, and wherein the resource commerce characteristic data required by the software commerce characteristic data of the VNF that has been deployed is included in the resource commerce characteristic data; and integrating software commerce characteristic data of the VNF that has not been deployed in the VNFs with resource commerce characteristic data required by the software commerce characteristic data of the VNF that has not been deployed to acquire the commerce characteristic data of the VNF that is not deployed, wherein the software commerce characteristic data of the VNF that is not deployed in the VNFs is included in the software commerce characteristic data, and wherein the resource commerce characteristic data required by the software commerce characteristic data of the VNF that has not been deployed is included in the resource commerce characteristic data.

3. The method according to claim 2, wherein reporting the commerce characteristic data of the VNFs to the slice orchestration system includes:

receiving a query request of querying the commerce characteristic data of the VNFs from the slice orchestration system;

locally retrieving the commerce characteristic data of the VNFs according to the query request; and reporting the queried commerce characteristic data of the VNFs to the slice orchestration system.

4. The method according to claim 1, comprising:
receiving commerce characteristic data of the VNFs reported by a Network Commerce Management Function (NBMF).

5. The method according to claim 4, wherein receiving the commerce characteristic data of the VNFs that is reported by the NBMF includes:
sending a query request of querying the commerce characteristic data of the VNFs to the NBMF; and
receiving a response information with which the NBMF responds to the query request, wherein the response information contains the commerce characteristic data of the VNFs.

6. A system for commerce characteristic data reporting and network slice orchestration, comprising a commerce characteristic data reporting device and a network slice orchestration device,
wherein the commerce characteristic data reporting device comprises:
a first receiving module, configured to receive software commerce characteristic data of Virtualization Network Functions (VNFs) from a VNF Manager (VNFM) and receive resource commerce characteristic data of the VNFs from a Virtualization Infrastructure Manager (VIM);
a first acquisition module, configured to acquire commerce characteristic data of the VNFs according to the received software commerce characteristic data and the received resource commerce characteristic data, wherein the commerce characteristic data of the VNFs comprises commerce characteristic data of a VNF that has been deployed and commerce characteristic data of a VNF that has not been deployed;
a reporting module, configured to report the commerce characteristic data of the VNFs to a slice orchestration system, wherein the reporting module is further configured to receive a lease term alarm information of the VNF that has been deployed, and to report the lease term alarm information to the slice orchestration system,
wherein the network slice orchestration device comprises:
a second receiving module, configured to receive the commerce characteristic data of the NVFs that is reported by the NBMF;
a second acquisition module, configured to acquire network characteristic data of the VNFs that is required by a user; and
an orchestration module, configured to orchestrate network slices according to the lease term alarm information, the commerce characteristic data of the VNFs and the network characteristic data of the VNFs,
wherein the lease term alarm information is clearable from the slice orchestration system.

7. The system according to claim 6, wherein the first acquisition module is further configured to integrate software commerce characteristic data of a VNF that has been deployed in the VNFs with resource commerce characteristic data required by the software commerce characteristic data of the VNF that has been deployed to acquire commerce characteristic data of the VNF that has been deployed, wherein the software commerce characteristic data of the VNF that has been deployed in the VNFs is included in the software commerce characteristic data, and wherein the resource commerce characteristic data required by the software commerce characteristic data of the VNF that has been deployed is included in the resource commerce characteristic data, and to integrate software commerce characteristic data of a VNF that has not been deployed in the VNFs with resource commerce characteristic data required by the software commerce characteristic data of the VNF that has not been deployed to acquire commerce characteristic data of the VNF that has not been deployed, wherein the software commerce characteristic data of the VNF that has not been deployed in the VNFs is included in the software commerce characteristic data, and wherein the resource commerce characteristic data required by the software commerce characteristic data of the VNF that has not been deployed is included in the resource commerce characteristic data.

8. The system according to claim 7, wherein the reporting module is further configured to receive a query request of querying the commerce characteristic data of the VNFs from the slice orchestration system, to locally retrieve the commerce characteristic data of the VNFs according to the query request, and to report the queried commerce characteristic data of the VNFs to the slice orchestration system.

9. The system according to claim 6, wherein the second receiving module is further configured to receiving a response information with which the NBMF responds to a query request of querying the commerce characteristic data of the VNFs, wherein the response information contains the commerce characteristic data of the VNFs.

* * * * *